US009665646B1

(12) United States Patent
Belan et al.

(10) Patent No.: US 9,665,646 B1
(45) Date of Patent: May 30, 2017

(54) METHOD AND SYSTEM FOR PROVIDING BIT RATE ADAPTAION TO VIDEO FILES HAVING METADATA

(71) Applicants: Adi Belan, Tel Aviv (IL); Adi Weiser, Givatayim (IL); Yoav Weiss, Saint Donat sur l'Herbasse (FR)

(72) Inventors: Adi Belan, Tel Aviv (IL); Adi Weiser, Givatayim (IL); Yoav Weiss, Saint Donat sur l'Herbasse (FR)

(73) Assignee: Flash Networks, Ltd, Herzilya (IL)

( * ) Notice: Subject to any disclaimer, the term of this patent is extended or adjusted under 35 U.S.C. 154(b) by 378 days.

(21) Appl. No.: 13/962,928

(22) Filed: Aug. 8, 2013

Related U.S. Application Data

(63) Continuation-in-part of application No. 13/086,369, filed on Apr. 13, 2011.

(60) Provisional application No. 61/681,620, filed on Aug. 10, 2012.

(51) Int. Cl.
*G06F 17/30* (2006.01)
*H04N 19/00* (2014.01)
*H04N 19/40* (2014.01)

(52) U.S. Cl.
CPC ....... *G06F 17/30784* (2013.01); *H04N 19/00* (2013.01); *H04N 19/40* (2014.11)

(58) Field of Classification Search
CPC .................... G06F 17/30784; H04N 19/00472
USPC ...................... 707/756; 375/240.01
See application file for complete search history.

(56) References Cited

U.S. PATENT DOCUMENTS

| 5,541,852 | A | * | 7/1996 | Eyuboglu | H04N 21/236 370/395.61 |
| 5,847,760 | A | * | 12/1998 | Elmaliach | H04N 19/15 348/390.1 |
| 6,014,693 | A | * | 1/2000 | Ito | H04N 7/17336 348/E7.073 |
| 6,807,528 | B1 | * | 10/2004 | Truman | G10L 19/002 370/528 |
| 7,424,058 | B1 | * | 9/2008 | Staley | H04N 19/172 375/240 |
| 7,565,375 | B2 | * | 7/2009 | Sorisho | G06Q 30/06 |
| 8,121,187 | B2 | * | 2/2012 | McGowan | H04N 21/23424 375/240.01 |
| 8,165,218 | B2 | * | 4/2012 | Costa | H04N 21/2343 375/240.23 |
| 8,208,351 | B2 | * | 6/2012 | Ma | G11B 20/10527 369/30.23 |
| 8,270,473 | B2 | * | 9/2012 | Chen | H04N 19/124 375/240.03 |
| 8,311,102 | B2 | * | 11/2012 | Lu | H04N 21/23424 375/240.1 |

(Continued)

*Primary Examiner* — Miranda Le
(74) *Attorney, Agent, or Firm* — Smith Tempel Blaha LLC; Gregory Scott Smith

(57) ABSTRACT

The technique for the delivery of a media file is adjusted based on current constraints on a channel being used by a device requesting the media file. The media file is copied and the various copies are optimized for different constraints. Then, the media file is delivered by examining the current constraints on the channel and transmitting the media data from the copy of the media file that is most suitable for the current constraints. In some implementations, the constraint is the bandwidth of the channel and the copies of the media file are based on different bit rate adjustments.

17 Claims, 10 Drawing Sheets

(56) References Cited

U.S. PATENT DOCUMENTS

| | | | |
|---|---|---|---|
| 8,396,114 B2* | 3/2013 | Gu | H04N 21/23439 370/235 |
| 8,437,389 B2* | 5/2013 | Zhang | H04N 21/23608 375/240.03 |
| 8,527,649 B2* | 9/2013 | Wexler | H04L 65/4076 709/203 |
| 8,705,616 B2* | 4/2014 | He | H04N 19/30 375/240.02 |
| 9,271,003 B2* | 2/2016 | Swenson | H04N 19/172 |
| 2003/0012278 A1* | 1/2003 | Banerji | H04N 19/46 375/240.12 |
| 2005/0002453 A1* | 1/2005 | Chang | H04N 21/2402 375/240.03 |
| 2007/0092149 A1* | 4/2007 | Sung | H04N 19/159 382/239 |
| 2007/0208774 A1* | 9/2007 | Paila | G06F 17/30067 |
| 2009/0238259 A1* | 9/2009 | Yeh | H04N 19/50 375/240.01 |
| 2009/0238277 A1* | 9/2009 | Meehan | H04N 19/124 375/240.16 |
| 2010/0061448 A1* | 3/2010 | Zhou | H04L 65/602 375/240.03 |
| 2010/0172378 A1* | 7/2010 | Arye | H04W 28/02 370/477 |
| 2011/0090953 A1* | 4/2011 | Melnyk | H04N 21/85406 375/240.03 |
| 2012/0314761 A1* | 12/2012 | Melnyk | H04L 65/605 375/240.02 |
| 2013/0101052 A1* | 4/2013 | Kaye | H04N 21/23655 375/240.26 |

* cited by examiner ably rendered using H.263 and Consequently, the file does not consume as much bandwidth during the downloading process.

METHOD AND SYSTEM FOR PROVIDING BIT RATE ADAPTAION TO VIDEO FILES HAVING METADATA

CROSS-REFERENCE TO RELATED APPLICATIONS

This is a utility patent application being filed in the United States as a non-provisional application for patent under Title 35 U.S.C. §100 et seq. and 37 C.F.R. §1.53(b) and, claiming the benefit of the prior filing date under Title 35, U.S.C. §119(e) of the United States provisional application for patent that was filed on Aug. 10, 2012 and assigned Ser. No. 61/681,620, which application is incorporated herein by reference in its entirety. This application is also being filed as a continuation-in-part application of the United States patent application filed on Apr. 13, 2011 and assigned Ser. No. 13/086,369, which application is incorporated herein by reference in its entirety.

BACKGROUND

Field of the Disclosure

The present disclosure generally relates to the field of data communication over a packet switch network. More particularly, the disclosure relates to bit rate adaptation of a compressed media file while it is being downloaded it to a surfer or target system or requesting system.

Description of Background Art

Today, more and more users, systems and applications search and browse through the Internet accessing a variety of different web sites that offer access to and the delivery of different media files. This searching and browsing process is generally referred to as "surfing" and the entities performing the surfing are generally referred to as "surfers". A few non-limiting examples of media files accessible through surfing include multimedia data, audio/video files contained in a container file such as Adobe Flash files, Microsoft Silverlight files, MPEG-4 files, etc. MPEG stands for Moving Picture Expert Group. The multimedia data files that are available for access and/or download can be embedded within web pages or they can be standalone media files. A few examples of popular web sites that provide a wide variety of media files for access, streaming, downloading, etc., include YouTube, Google Video and Yahoo Video. Many other web sites are also available for gaining access to media files. Throughout the description and the claims the terms multimedia, media, audio or video files may be used interchangeably and the term multimedia data can be used as a representative term for any type of file. Further, the term surfer may be used to refer to any equipment that is accessing, requesting and/or receiving content from the network, as well as a user that may be actuating such equipment.

Some media files use a container-file-format for delivering media files over the Internet Protocol (IP) network. Usually, a surfer can use a video player to observe a video file. An exemplary player can be a Flash Player, MPEG-4 player, etc. The player may be an application that can be invoked by the surfer's browser application, an embedded feature of a browser, a stand-alone application and even a stand-alone device. A few examples of such video players that are commonly used include the Adobe Flash Player and the Microsoft Silverlight player and the MPEG-4 player; however, many other players are also available for use.

For a variety of reasons, including the complexity of the technology and the level of clarity and resolution provided, a typical audio/video file can be rather large in size. Consequently, downloading of a typical video file can consume a significant amount of bandwidth and require a considerable amount of time. Although when first introduced, such multimedia data files were typically only available for downloading to computers connected via hardwired connections to the Internet, technology has advanced to the point where such multimedia data files are available for download over wireless networks to mobile devices. For instance, mobile devices such as, but not limited to, notebook computers, cellular telephones or handsets, handheld computers, Personal Data Assistants (PDA), or other computing devices with wireless communication capabilities are able to access, download and view multimedia content.

Although technology advancements have greatly improved the bandwidth available to mobile devices, thereby improving the download speed of data, the download time for mobile devices is still somewhat bandwidth limited compared to hardwired access to the Internet and as such, mobile devices can experience considerable delays when downloading video files. Further, very often the available bandwidth over wireless network can dramatically change from moment to moment, for example while moving from one base station which is less occupied to another one which is more occupied, etc.

The typical video player can commence the presentment of video content after only a portion of a video file is received and while the remainder of the video file is still being downloaded. Such a download can be referred to as a progressive download. Usually, the time required to download a video file is less than the time required to present the video file. Therefore, the video data that has been downloaded but that has not yet been rendered or presented by the video player can be stored in a buffer. In many situations, a surfer may decide to stop watching the video or to skip to another web page before reaching the end of the entire video file.

Typical video players provide a progress bar that graphically indicates how much of a video file has been downloaded, what portion of the video file had been viewed and where the currently viewed video is located within the file (i.e., cursor). In addition, such features may also include a "seek" or forward/reverse feature. By pressing on a certain place along the progress bar, a surfer can control the location from which the player will present the next video frames. A common progress bar can illustrate the runtime that is needed for playing the entire received video file.

Because of their large size and the value of bandwidth, video files are often-times compressed to reduce their volume. Common compression methods can be based on standards such as, but not limited to: H.263, H.264. The compressed files can be contained within a container file such as MPEG-2, MPEG-4, etc. The H.263 and H.264 methods are International Telecommunication Union (ITU) standards and MPEG2 and MPEG4 are Moving Picture Experts Group (MPEG) standards. More information on the above-identified standards can be found at the web sites available using the following URL information where the symbol <dot> represents a period in the URL: www<dot>itu<dot>int or www<dot>mpeg<dot>org (respectively), the content of which is incorporate herein by reference. Some of the compression methods are more efficient than the others. For instance, the H.264 technique is more efficient than the H.263 technique. Consequently, a video file that is compressed according to the H.264 standard has fewer bytes than the same video file, which compressed according to the H.263 standard without having any adverse affects or degradation of the presentation quality.

A compressed media file that has been compressed using a typical compression technique can include several types of frames. As non-limiting examples, the types of frames can include: an Intra frame, an Inter frame, etc. An Intra frame can also be referred as a key frame. The terms "Intra Frame" and "Key Frame" are used interchangeably throughout this description and the claims. The media data of an Intra frame (key frame) is compressed relative to information that is contained only within the current frame and not relative to any other frame in the media sequence. In contrast to an Intra frame, an Inter frame is a frame in a media compression stream that is expressed in terms of one or more neighboring frames. An Inter frame can be referred also as 'P' frame or 'B' frame. The present disclosure refers to a key frame or an Intra frame as a frame that can enable proper decoding done on a portion of a media file from the key frame (Intra frame) to the end of the file.

Multimedia data contained within a container file (such as a Flash file, MPEG-4 file, for example) can and typically does include metadata. The included metadata can be transmitted before the video data. The metadata may include the type of codec, the playing duration of the file, and the location of different frames (audio as well as video frames) in the compressed multimedia data. For instance, the metadata may identify an offset in data units (bytes, octets, bits, words, etc.) and/or time units within a media file where the beginning of a frame can be located or played.

An access network operator (ANO) is the entity that provides, provisions and manages infrastructure that provides access to the Internet for subscribers. Examples of an ANO can be a telecom operator, such as but not limited to: a cellular operator, a satellite communication service provider, a Public Switched Telephone Network (PSTN) operator, Internet Service Provider (ISP) premises, etc. Thus, the main commodity that an ANO delivers is bandwidth and as such, ANOs seek and employ the use of different methods for handling the downloading of multimedia data to improve the surfer experience and the utilization of their bandwidth resources. Some of the methods include a buffer limiter. The buffer limiter limits the amount of data (i.e., the number of bytes) that can be downloaded by an entity until the entity observes previously downloaded data (i.e., the playback of the video commences). Other common methods use adaptive bit-rate (ABR) or dynamic rate adaptation (DRA) method in which every group of pictures (GOP) the rate can be changed.

Yet other methods can reduce the volume or size of the video files that are transferred via an access network. Reduction of the volume of the video files can be done on the fly by converting the format of the media file into streaming and transcoding (converting) the compression standard used into an improved compression standard during downloading of the file. For example, if a media file was compressed according to H.263, an exemplary ANO can transcode the compressed video into H.264 thereby reducing the file size. Such a transcoding can improve the surfer's experience by accelerating the rendering of the video file as well as reducing the bandwidth consumption over the communication links between a surfer and the access network. Other systems may use trans-rating method by which the bite-rate of the compression is increased or decreased according to the current needs.

BRIEF SUMMARY

A surfer that observes a media file over a connection that exhibits or has a variable bandwidth (BW) may suffer from delay or even intermissions/interruptions while observing the video file. For example, if a multimedia file downloading session is started with an available BW of 400 Kb/s over the connection to the surfer's device, then the used compression bit rate of the file can be 300 Kb/s. In this scenario, the video can be rendered to the surfer's device in a smooth continuous manner and data that is waiting to be rendered can be stored within a buffer of surfer device. At any particular moment, the available BW over the over the connection may be decrease, such as dropping from 400 Kb/s to 100 Kb/s as a non-limiting example. The BW available over a connection can be reduced due to a variety of factors, such as additional surfers moving to the same base station, for example. As a result of the decrease in BW, the player rendering the content may drain the buffer in the surfer device. Because the buffer was loaded with data delivered when the BW was 400 Kb/s, after a few seconds the player may deplete the buffer and start working fragmentally. When the buffer becomes depleted, the player may freeze the image while waiting to obtain or receive enough data to continue playing the session. Thus, this has the effect of reducing the quality of experience of the surfer who is forced to see the video session in a fragmented way.

A common solution that can be employed to counteract the decrease in the BW of the connection is to adapt the compression bit rate to the current available BW. However, reducing the compression bit rate may adversely affect the quality of the video image. For example, although the video session may run smoothly or fluently, the video image may become less sharp, pixilated, reduced resolution. Such a solution may be acceptable to some users over having to endure a fragmented session.

Similar needs can be raised in a situation in which a certain path, between a sender and a receiver, includes a segment that requires a constant bit rate or a fix size of a packet, a cell or a frame, for example. An ATM cell can be one of the examples.

Further, changing the compression bit rate may have an effect on the decoding process. This condition is true, for example, when the compressed multimedia data contained within a container file has metadata at the beginning of the file prior to the compressed video file. Even further, changing the compression bit rate while downloading the file may create a mismatch between the information that has already been sent as part of the metadata with the correct current parameters that are related to the new compression bit rate. For example, reducing the compression bit rate in the middle of the file will effect the offset in bytes that corresponds with the beginning of each following video and/or audio frame compared to the location that is written in the metadata, thus preventing or complicating the decoding of the file at the surfer device.

Exemplary embodiments of the present disclosure present a novel system, method and technique for providing compression bit rate adaptation while downloading multimedia data contained within a container file when the container file includes metadata at the beginning of the file. An MPEG-4 file is an example of a container file that has the metadata located at the beginning of the file and being transmitted to a surfer device before the compressed multimedia data. Through the discloser, an MPEG-4 file is used as a representative file format for any other container file formats that have the metadata before the compressed multimedia data. Examples of such media file can comprise MP4, MOV, 3GP, etc. Thus, although the specific embodiments that may employ the MPEG-4 format are considered to be novel, other embodiments that include substituted file formats are also considered to be novel and, the term MPEG-4 may thus be used as a generic term of such file formats.

The bit-rate adapted files are provided to a requesting device, such as a surfer operating a browser, a web-connected device, a media player, or any of a variety of computing devices that may download and render multimedia content and particularly audio/video media content. The disclosed bit-rate adapted file enables proper decoding and seeking operation in a bit-rate adapted multimedia data.

Some embodiments may solve the needs in which constant bit rate or fix packet size is required by one of the communication protocols that is used over a path between a sender and a receiver.

Some examples of the novel technique may use stuffing to compensate between the sizes of a frame of a video image that is compressed using two or more bit rates. Thus, relevant frames in the video file that are compressed using two or more different bit rates will have the same offset from the beginning of the file, and thus, will have the same location. Stuffing can also be used in compressing the audio frames. The use of stuffing keeps the location of similar frames in the same location in different streams, thus the metadata of the streams is the same. Each stream is compressed with different bit rate. The stuffing can be done by inserting bytes of all zeros or all ones (FF16), for example.

Further, in order to eliminate the additional size that would be realized due to the stuffing in each frame, a lossless compression can be employed on the compressed streams with the stuffing. The lossless compression can comply with GZIP, Deflate algorithm, for example. The lossless compression can reduce consecutive bytes of the stuffing into much fewer bytes, such as one byte or less per frame, for example. On the other end of the communication link at a user device for example, a lossless decompression can be implemented to restore the compressed video according to the relevant bit rate and the additional stuffing. Thus, the location of the beginning of each compressed frame in each of the different streams is the same.

In some embodiments, the compression can be implemented offline. A stream of video images can be compressed into two or more compressed video streams according to a compression standard, such as H.264, as a non-limiting example. Further, each stream can be compressed according to a different bit rate. Then, the compressed stream can be processed by a metadata processor that runs over each frame of the two or more streams. For each video frame, the metadata processor compares the relevant compressed frame in each stream and adds stuffing to equalize the size of the relevant frames of the different streams. Then for each compressed stream, a similar metadata is created according to file container standard. The metadata is added to the beginning of video file. An example of a container file can be MPEG-4 which is well known in the art. The location of similar frames in the two or more streams is the same although they were compressed in accordance with different bit rates. The compressed files can be stored in a trans-rated database (DB).

When a surfer submits a request to fetch this video file, the trans-rated DB is accessed to obtain the appropriate compressed video file. In some embodiments, the compressed video file is selected based solely, or at least in part (depending on the embodiment) on the currently available BW over the channel(s) to be used in the delivery of the video file. Thus, a compressed video file, which was compressed according to a bit rate that is smaller than the currently available BW or most suitable to the current channel(s) is selected from the trans-rated DB and be transferred via a lossless encoder, such as GZIP, for example, toward the requesting surfer's device. In other embodiments, more generic criteria may be used to determine when to switch from the transmission of one trans-rated video file to the next. For instance, constraint on the communications channel to the requesting device may be used in connection with determining when to switch from the transmission of one trans-rated video stream to the next. Thus, the constraint can be defined to be any constraint as well as combinations of constraints. Any such definition will be referred to as a defined value of a constraint (DVC).

From time to time during the transmission of the video file (as a non-limiting example, every few seconds), the currently available BW can be checked to determine if it has changed. Checking the currently available BW can be done in a variety of manners. As a non-limiting example, the currently available BW for a channel or channels can be determined by measuring the number of bits that were sent in a certain period of time. The information can be obtained from a network interface card (NIC), for example. In some embodiments, the command to change bit-rate can be obtained from one or more servers from the ANOP 130 (FIG. 1).

If a change in the currently available BW is detected, such that the continued transmission of the video file requires or could benefit from an adaptation of the compression bit rate, then a different compressed file can be selected for continuing of the download process. The download can then be continued from the next frame in the newly selected compressed video stream. The new stream is transferred via the lossless compression toward the surfer's device. As described above, the new stream complies with, or is compatible with the metadata that was sent at the beginning of the first stream. At the receiving surfer's device, a decoder decodes the video file using the metadata that was received with the beginning of the first file or stream.

In other embodiments, the trans-rated adaptation can be in an online mode and in real time. In such embodiments, before compressing the video file, a decision can be made with regards to the size of each Intra frame and each Inter frame. In selecting or defining the size, the selected frame sizes should be bigger than any expected size of a frame. As a non-limiting example, the size of an Intra frame can be selected as 5000 bytes and the size of an Inter frame can be selected as 1000 bytes and thus, in the described but non-limiting embodiment, the Intra frame can be five times larger than an Inter frame. In some embodiments, based on the number of frames of each type and the estimated bit-rate required by the surfer's device, an Intra frame size and an Inter frame size can be calculated.

When a video file is requested by a device, in some embodiments a metadata processor can process the uncompressed video file by determining which compression technique to use and, which frames to compress as an Intra frames, Inter frames or both. The decision can be based on a variety of factors and as non-limiting examples, some of the factors may be the amount of changes between frames, the number of frames from the last Intra frame or any combination of those as well as other factors. A predicted metadata can then be created based on a fix size per each type of frame. The predicted metadata can be sent at the beginning of the transmission of the video stream or file, such as an MPEG-4 file, for example.

At this point, an H.264 encoder, for example, can start compressing the file according to a bit rate that is suitable for the currently available BW. The metadata processor can instruct the encoder to compress a next video frame as an Intra frame or Inter frame according to the predicted metadata.

The output of the compressed video stream can be passed through a stuffing engine that adds stuffing to each frame to reach the predefine size of each Intra frame and predefine size of each Inter frame, for example. From the output of the stuffing engine, the compressed video stream is transferred via a lossless encoder, such as GZIP encoder, that compresses the stuffing into one byte, for example. The lossless compressed file can then be transmitted toward the surfer's device. From time to time, the current available BW is checked and accordingly, the bit rate controller of the H.264 encoder can be adapted. A typical browsing application running at the surfer's device is capable of handling data of a received file that has been compressed by a lossless compression standard such as GZIP for example. Thus, at the other side of the connection, a received file is first decoded by the lossless decoder and then, it is transferred toward the MPEG-4 player.

The foregoing summary is not intended to summarize each potential embodiment or every aspect of the various embodiments, and other features and advantages of the present invention will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the embodiments with the accompanying drawings and appended claims.

BRIEF DESCRIPTION OF THE SEVERAL VIEWS OF THE DRAWING

Exemplary embodiments of the present disclosure will be understood and appreciated more fully from the following detailed description, taken in conjunction with the drawings in which.

DETAILED DESCRIPTION OF VARIOUS EMBODIMENTS

The present disclosure presents various embodiments, as well as features, aspects, functions, etc., of a bit rate adaptor that can be used for adjusting the compression rate of video files that have metadata. Various embodiments of the bit rate adaptor can be used in environments such as channels that have varying BW availability. Turning now to the figures in which like numerals represent like elements throughout the several views, exemplary embodiments of the bit rate adaptor are described. For convenience, only some elements of the same group may be labeled with numerals. The purpose of the drawings is to describe exemplary embodiments and the drawings are not for production. Therefore, features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. To execute a certain task, a software program may be loaded into memory of or memory accessible by an appropriate processor as needed. In the present disclosure the terms task, method, process can be used interchangeably.

Figure 1:
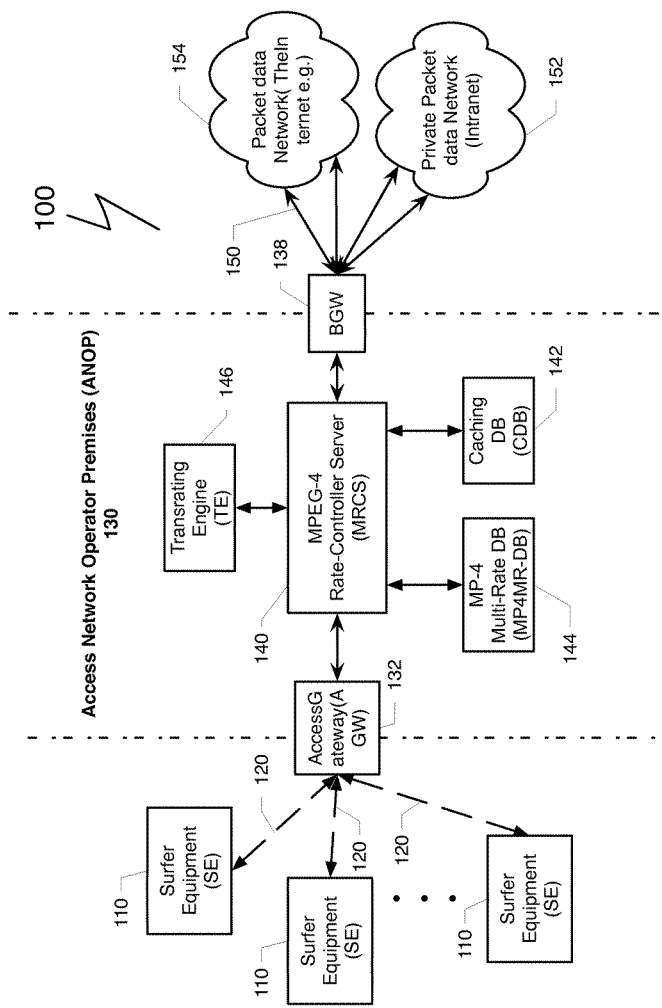
FIG. 1 illustrates a block diagram with relevant elements of an exemplary Access Network Operator Premises in which an exemplary embodiment of the present disclosure can be implemented.

FIG. 1 is a block diagram illustrating relevant elements of an exemplary network 100 in which an exemplary embodiment of the bit rate adaptor can be implemented. Network 100 can comprise an Access Network Operator Premises (ANOP) 130. The ANOP 130 can be a cellular operator, a telecom operator, an Internet provider, a satellite communication service provider, a Public Switched Telephone Network (PSTN) operator, etc. Other exemplary embodiments of the bit rate adaptor can be installed at other locations or in other environments, such as an Internet Service Provider (ISP) premises, cable operator, and so on.

An ANOP 130 can provide different services to a plurality of different surfers (or to the surfer equipment SE utilized by a surfer) 110. A few non-limiting examples of typical surfer equipment (SE) 110 can be: a laptop computer, a mobile telephone, a PDA (personal digital assistance), a computer, a smart phone, a tablet computer, a set-top box, etc. A few non-limiting examples of services provided by an ANOP can include: spam filtering, content filtering, bandwidth consumption distribution, transcoding, rate adaptation, etc. An ANOP 130 typically identifies a plurality of SE 110 at its ingress by utilizing an access gateway 132 (AGW) for example. A few non-limiting examples of an AGW 132 include: a Gateway GPRS Support Node (GGSN) in a GSM network, a PDSN in a CDMA network, an Evolved Packet Data Gateway (ePDG) in 4G LTE (long-term evolution), etc. An exemplary ANOP 130 can be required to: identify the services being requested by the SE 110; identify the services a subscriber utilizing the SE 110 is entitled to receive; route traffic of the subscriber through the appropriate services; and output processed data toward the subscriber, for example.

An SE 110 can be connected to the AGW 132 through different communication links 120. The communication links 120 can be, as non-limiting examples, wireless links, wired links, ADSL links, cellular links, TV cables, and so on. The ANOP 130 can comprise, at its interface to a network, a border gateway (BGW) 138. The BGW 138 can be an Internet Protocol router, for example. The BGW 138 can be connected to a plurality of packet data networks 154 such as, but not limited to, the Internet. The BGW 138 can also be connected to private packet data networks 152 such as, but not limited to an intranet, LAN, WAN, etc. The communication between the BGW 138 and the packet data network 154 and/or private packet data network 152 over the communication links 150 can be packet oriented based on the Internet Protocol (IP), for example.

In addition to other type of servers, the ANOP 130 can comprise an example embodiment of an MPEG-4 Rate-Controller server (MRCS) 140, a Transrating engine (TE) 146, a caching DB (CDB) 142 and an MP4 Multi-Rate DB (MP4MR-DB) 144. The MRCS 140 can receive data packet communications transmitted between the plurality of SE 110 and the plurality of servers located at networks 152 and 154 via the AGW 132 and BGW 138, respectively. In the upload direction, the MRCS 140 can intercept packets received from the SE 110, identify requests for fetching MPEG-4 compressed media files, process the request and determine whether to respond to the request from the MP4MR-DB 144 or to transfer the request toward its destination via the BGW 138. If the request is for a new MPEG-4 file, or for additional data of a currently handled MPEG-4 file, then the request can be transferred toward its destination, a web server for example. If the request is for data of a currently handled trans-rated MPEG-4 file, which is being delivered from or is or has been processed by the MP4MR-DB 144, then the request can be handled by the MRCS 140 and MP4MR-DB 144. The trans-rated MPEG-4 file that is selected from the MP4MR-DB 144 to be transferred toward a SE 110 can be adapted to a currently available BW that exists between the SE 110 and AGW 132.

In some embodiments of the MRCS 140, a request for a new MPEG-4 file can be further processed to determine whether the size of the requested data chunk fits the needs of the MRCS 140 for associating a signature to that MPEG-4 file. The signature can be used for identifying the media file and associating it with the two or more trans-rated copies of that file in two or more different bit-rates.

An exemplary signature (marking) procedure can be done by implementing a hash function over a pre-defined number of bytes from the beginning of the requested media file. The pre-defined number of bytes can be in the range of 5,000 to 15,000 bytes, for example. An exemplary hash function can be MD5. Other exemplary embodiments may use other hash functions such as, but not limited to: MD4, SHA-1, SHA-2, etc. MD5 and other different hash functions are well known in the art and are disclosed in many technical books and therefore will not be further disclosed. Along the description the term MD5 can be used as a representative term for a hash function.

In the download direction, packet communications arriving from the packet data networks 154 or private packet data networks 152 toward the SE 110 can pass via the BGW 138 toward the MRCS 140. The MRCS 140 can intercept the packet data traffic; identify original compressed MPEG-4 files, and determine whether the received compressed media file can be replaced by a corresponding trans-rated MPEG-4 file that is stored in MP4MR-DB 144 or that could be generated in real-time. If the original compressed media file cannot be replaced by a trans-rated file, the compressed file is transferred as is toward the appropriate SE 110 and a copy of it can be stored in the CDB 142 for following requests or to be offline trans-rated to one or more bit-rates and be stored in MP4MR-DB 144.

If the original compressed media file can be replaced, then an appropriate trans-rated file can be selected from MP4MR-DB 144 (or generated) and be sent toward the appropriate SE 110 via the AGW 132. The trans-rated MPEG-4 file that is selected to be transferred toward a SE 110 can be selected to adapt to a currently available BW that exists between the SE 110 and AGW 132.

In various embodiments, the CDB 142 can be used for storing a plurality of MPEG-4 files that are waiting to be trans-rated and the MP4MR-DB 144 can be used for storing a plurality of trans-rated MPEG-4 files. In some embodiments, a single DB can be used for storing both types of MPEG-4 files.

A plurality of tables can be used by the MRCS 140 to assist in different types of operations. Non-limiting examples of such types of operations can include: managing different databases; offline trans-rating operation; online responding to a request for a media file, and so on. The CDB 142 can be managed by using a CDB Table (CDB-T), for example. The CDB-T can have a plurality of entries with each entry being associated with a received original MPEG-4 file, for example. The MP4MR-DB 144 can be managed by an MP4DB table (MP4DB-T), for example. Each table can be stored in a memory device.

An exemplary MRCS 140 can scan the CDB-T, and select the next original MPEG-4 file to be trans-rated. The selection can be based on different information stored in the management fields of the CDB-T. Such information can be, but is not limited to: the number of times that the MPEG-4 file was transferred via the MRCS 140; the time duration from the last time that the MPEG-4 file was transferred via the MRCS 140, etc. The selected original MPEG-4 file with its metadata can be sent toward a trans-rating engine (TE) 146.

An exemplary TE 146 can use a plurality of H.264 encoders. Each encoder can compress the file at a different bit-rate. Alternatively, the TE 146 can use a plurality of trans-rating programs, such as the ones available in the FFMPEG library (a free software library that provides a cross-platform solution to record, convert and stream audio and video), or a commercial trans-rating server such as Envivio 4Caster C4 that is manufactured by Envivio Inc. A reader who wishes to learn more about trans-rating servers can access the Envivio website at the following URL: www<dot>envivio<dot>com, as well as other sites and literature. In some embodiments of the ANOP 130, the TE 146 can be included in the MRCS 140.

The MP4MR-DB 144 and the CDB 142 can be used in an ANOP 130 that utilizes an example of an MPEG-4-Offline-Rate-Controller Server (MORCS). In other embodiments of the ANOP 130, in which an example of MPEG-4-Real-Time-Rate-Controller Server (MRTRCS) is used, the MP4MR-DB 144 and the CDB 142 may not be used. More information on the operation of an example of MORCS is disclosed below in conjunction with the description of FIGS. 2, 4, 5 and 6. More information on the operation of an example of MRTRCS is disclosed below in conjunction with the description of FIGS. 3, 7 and 8.

Figure 2:
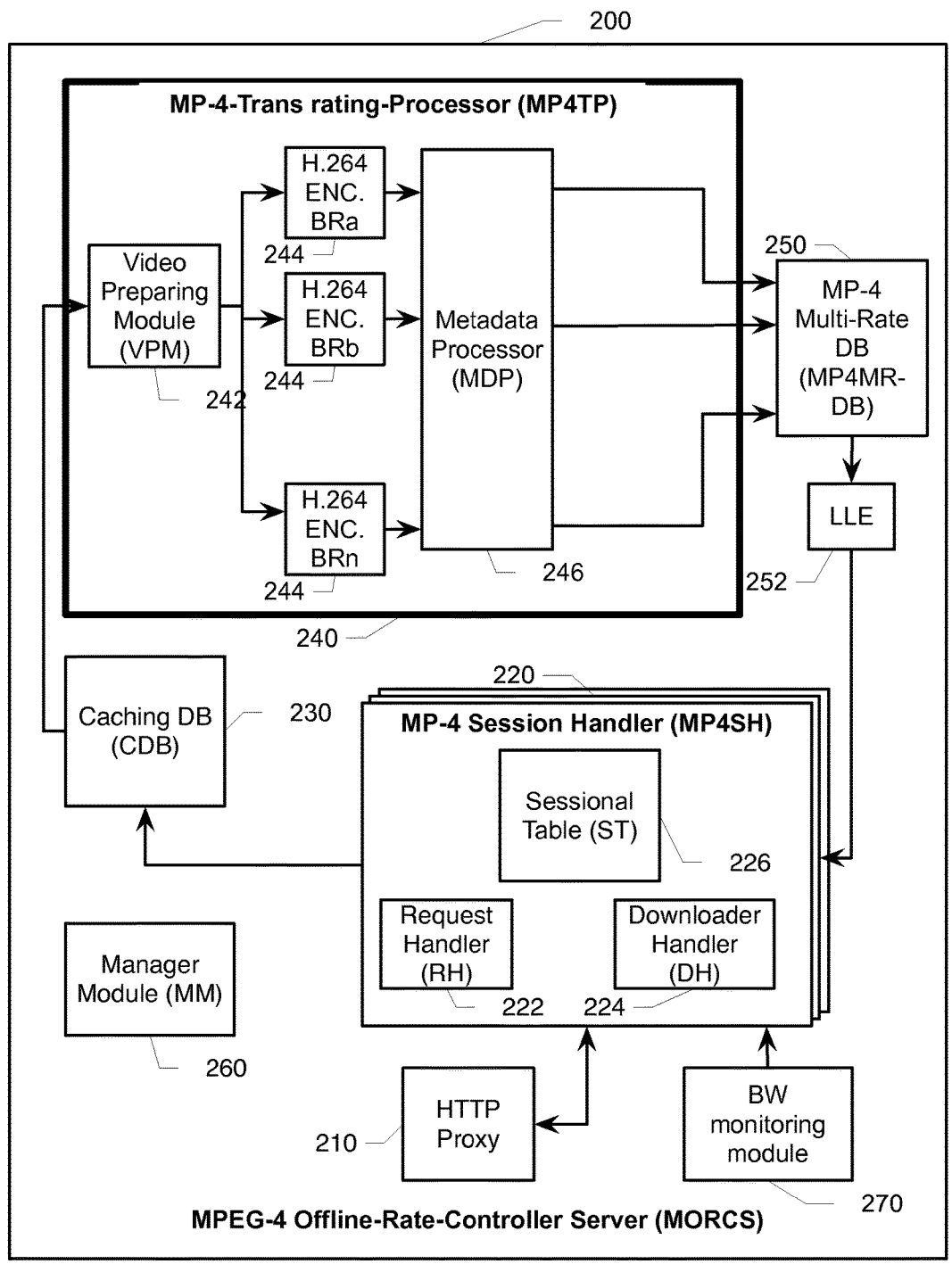
FIG. 2 illustrates a block diagram with relevant elements of an example of an MPEG-4 Offline-Rate-Controller Server (MORCS), according to the teaching of the present disclosure.

FIG. 2 is a block diagram illustrating relevant elements of an example embodiment of an MPEG-4-Offline-Rate-Controller Server (MORCS) 200. The illustrated example of an MORCS 200 is shown as comprising an HTTP proxy 210, a plurality of MP4 session handlers (MP4SH) 220, a BW monitoring module 270, a manager module (MM) 260, and an MP4-transrating processor (MP4TP) 240. In addition, the MORCS 200 can be associated with two functional databases: a CDB 230 and an MP4MR-DB 250. The CDB 230 and/or MP4MR-DB 250 can be internal DBs, as illustrated in FIG. 2, or external DBs, as illustrated in FIG. 1. The CDB 230 and MP4MR-DB 250 can be managed by the MM 260. The MM 260 may use two tables: a CDB Table (CDB-T) for controlling the CDB 230 and an MP4MR-DB table (MP4DB-T) for controlling the MP4MR-DB 250. A lossless compression encoder (LLE) 252 can be associated with the output of the MP4MR-DB 250. An exemplary LLE 252 can comply with a lossless compression algorithm such as, but not limited to, GZIP, Deflate, etc.

In another exemplary embodiment of an MORCS, an embodiment of the MP4TP 240 can be implemented by an external transrating engine as it is illustrated in FIG. 1. Yet in another embodiment, the BW monitoring module 270 can also be an external unit (such configuration is not shown in the drawings) and just sends indications about the currently available BW to the MP4SH 220 directly or via the MM 260.

An example of MP4SH 220 can comprise a request handler (RH) 222, a download handler (DH) 224 and a sessional table (ST) 226. The ST 226 may comprise a copy of a section of the MP4DB-T that is related to the MPEG-4 file that is currently handled by the MP4SH 220.

An example of the MP4TP 240 can comprise a video preparing module (VPM) 242, two or more video compression encoders 244, and a metadata processor (MDP) 246. Each encoder 244 can compress a received video image at a different bit-rate (BRa, BRb and BRn, for example). A non-limiting example of a video compression encoder 244 can comply with H.264 compression standard.

An example of an HTTP proxy 210 can be a transparent HTTP proxy. In one direction, the HTTP proxy 210 can receive a plurality of request packets from different surfers using SE 110 (FIG. 1). For each received packet, among other things, the HTTP proxy 210 can process the received packet. Based on the header of the packet, the HTTP proxy 210 can determine whether or not the packet is a request for an MPEG-4 file. If the packet is not a request for an MPEG-4 file, the packet can be transferred as is toward its destination.

If the request is for an MPEG-4 file, then based on the IP address of the source of the packet and the destination IP address (the server IP address and the surfer's IP address, respectively) the HTTP proxy 210 can determine whether an MP4SH 220 has been allocated for that session. If an MP4SH 220 has been allocated, then the packet can be transferred toward an RH 222 of the appropriate MP4SH 220.

The request can be related to a multimedia file, such as an MPEG-4 file. As such, the request can be a request related to downloading a new multimedia file or, a request related to a multimedia file that is currently being downloaded or presented on the relevant SE 110. If no MP4SH 220 exists for that session, the HTTP proxy 210 can request the Manager Module 260 to create an MP4SH 220 for the specific session. The allocated MP4SH 220 can be associated with the session based on the IP address of the surfer and the IP address of the relevant server. The HTTP proxy 210 can manage a table that associates the IP address of the surfer and the IP address of the relevant server with the allocated MP4SH 220.

In the other direction, an exemplary HTTP proxy 210 can receive responses to the surfers' requests from one or more web servers. The responses can include a compressed media file contained in a container file that includes metadata, wherein the metadata is transmitted at the beginning of the container file before the video data. Throughout the disclosure, the term MPEG-4 file is used as a representative example of such a container file. Based on the source and the destination IP addresses, the HTTP proxy 210 can transfer the received responses to a DH 224 in the appropriate MP4SH 220.

An exemplary Request Handler (RH) 222 suitable for use in various embodiment can receive a request, such as a request for a media file, from a surfer 110 via the HTTP proxy 210. An example of a media file can be a compressed video data file contained in a container file such as but not limited to MPEG-4. The request can be from the beginning of a new MPEG-4 file or can be from a certain offset, in bytes or time, from the beginning of an MPEG-4 file that is currently being downloaded or presented on the SE 110 (FIG. 1). In addition, the request may be for commencing the download and rendering of a video file at a particular portion of the video file. For instance, a video player may allow the surfer to select and commence the playback of a video file at any location within the vide file. An example RH 222 can parse the request's HTTP header in order to determine whether the request is for downloading a new MPEG-4 file or a seek request. A seek request is a request that is initiated by the media player, while playing a media file at the SE 110 (FIG. 1), in response to the surfer using a progress bar that points on the approximate location of the presented image in respect to the file.

If the request is for downloading a new MPEG-4 file, the RH 222 can parse the HTTP header of the request and check if it meets the requirements of the exemplary MORCS 200. Exemplary requirements can be: a minimum number of bytes requested from the destination; and so on. The required minimum number of bytes can be the pre-defined number of bytes that the MORCS 200 needs for executing the signature (hashing) operation on the response, for example.

If the header of the request does not meet the MORCS 200 requirements, then the RH 222 can modify it to meet the requirements. An exemplary embodiment of a modification can be: changing the field in the header of the request such that the number of bytes requested by the media player of the SE 110 from the web server, the size of the first chunk of the compressed media file to be downloaded, meets a minimum requirement. A request that its header meets the MRCS 200 requirements can be sent as is toward its destination via HTTP Proxy 210.

If the request is a seek request or requests for sending additional data chunks of the same media file, then the RH 222 may determine, based on the information stored in ST 226, whether the response should be served from one of the databases (CDB 230 or MP4MR-DB 250) or from a web server. If the response is a cached MPEG-4 file or a trans-rated MPEG-4 file from one of the databases, the request is transferred to a queue of DH 224 for further processing. If the response is from a web server, the request is transferred via proxy 210 toward its destination server.

In response to a request from an SE 110, the destination, a web server at the Internet 154 (FIG. 1) for example, can send the requested media file toward the HTTP Proxy 210. The HTTP Proxy 210, based on the source and destination IP addresses of the packet, can transfer the received response to the DH 224, of the appropriate MP4SH 220.

An exemplary embodiment of a DH 224 can execute a hash function (signature function) on the first pre defined number of bytes, N bytes from the beginning of a received media file. Non-limiting examples of a hash function can be: MD5, MD4, SHA-1, SHA, etc. According to the hash function value, the DH 224 can check, using the CDB-T and the MP4DB-T, if the media file exists in one of the two data bases CDB 230 or MP4MR-DB 250, respectively. If the calculated hash value (calculated signature) is the same as one of the signatures previously stored in the relevant table, CDB-T or MP4DB-T, it indicates that the requested file is stored in the relevant DB.

If the calculated hash value (calculated signature) does not fit any of the signatures stored in the relevant table, CDB-T or MP4DB-T, it indicates that the requested file is not stored in those DBs. In such a session, the DH 224 can request the MM 260 to allocate a section in the CDB 230 for storing the received media file. Further, DH 224 can create an ST 226 and store within the ST information related to the section in CDB 230 that was allocated for that MP4 file, as well as information regarding the requested file, information such as the calculated signature, the URL used to fetch that file, the receiving time, etc. A copy of the received MP4 file with its metadata from the received packet is stored in the CDB-T and the packet is transferred toward the requesting SE 110 via HTTP proxy 210. The process continues for each received packet until the end of the file. Then, a portion of the ST 226 can be copied to the CDB-T updating the CDB-T with the information that is related to that stored MPEG-4 file. The copied portion may not include the URL that can be change in other sessions.

If the file is stored in the CDB 230, the DH 224 can update the relevant entry in the CDB-T by incrementing a field in the entry that counts the number of received requests for the relevant file as well as update the field that holds the receiving time of the last requested. This data can be used later on by the MM 260 for determining which MPEG-4 file stored in the CDB 230 will be trans-rated next by MP4TP 240. Then, the section of the CDB-T, which is related to that file, is copied into the ST 226. Using the updated ST 226, the DH 224 can start sending the cached data of the requested MPEG-4 from the CDB 230 toward the requesting surfer, via proxy 210, in response to receiving surfer's requests for that file.

If the file is stored in the MP4MR-DB 250, the DH 224 can update the relevant entry in the MP4DB-T by incrementing a field in the entry that counts the number of received requests for the relevant file, as well as updating the field that stores the receiving time of the last request. This information can be used later on by MM 260 for determining which MPEG-4 file will be deleted from the MP4MR-DB 250. Then, information from the section of the MP4DB-T, which is related to that file, can be copied into the ST 226.

The information can indicate the location, in the MP4MR-DB 250, in which the metadata of the file is stored, and the location where each trans-rated copy of the requested MPEG-4 file is stored, wherein each trans-rated copy of the MPEG-4 file was compressed in different bit-rate. The location of each copy can include the location, in the MP4MR-DB 250, of the beginning of each video and audio frame of that file. The found information can be obtained and be loaded into an ST 226. A single metadata is used for the two or more trans-rated MPEG-4 files.

In addition, an exemplary ST 226 can comprise a plurality of rows and columns. Each row can be associated with a frame number (audio or video). Each column along that row can store information that is related to that frame. Information that can be stored may include, but is not limited to: the type of the media (audio, video), the type of the frame (Intra or Inter), the size of the frame, the starting time in which the frame is played, etc. The following columns, one per each copy of the MPEG-4 file, can point on the location of that frame, of that trans-rated copy of the MPEG-4 file, in the MP4MR-DB 250.

Using the updated ST 226, the DH 224 can start sending the trans-rated MPEG-4 data of the requested MPEG-4 file from the MP4MR-DB 250 toward the requesting surfer, via proxy 210, in response to receiving surfer's requests for that file. Downloading the trans-rated MPEG-4 file can be done by selecting and sending, via the LLE 252, an appropriate trans-rated MPEG-4 file from the MP4MR-DB 250 that is most suitable for the currently available BW, and then sending the data toward the requesting SE 110. The currently available BW indication can be received from the BW monitor module 270. More information on the process of handling trans-rated MPEG-4 files is disclosed below in conjunction with FIG. 5.

An exemplary BW-monitoring module 270 can be a section of a network-interface card (NIC). The BW-monitoring module 270 can count the number of bits that are transmitted during a period of time, such as a few tens of milliseconds to few seconds as non-limiting examples. The number of transmitted bits during the measuring interval can be used for reflecting the current available BW. An exemplary BW-monitoring module 270 can be configured to deliver the currently available BW per each surfer's connection. In other embodiment of MORCS 200, a plurality of BW-monitoring modules 270 can be used. Each BW-monitoring module 270 can be associated with an MP4SH 220, for example. In some embodiments of the MORCS 200, the currently available BW can be obtained from one of the servers of ANOP 130 (FIG. 1).

An exemplary embodiment of a Manager Module (MM) 260 can allocate a plurality of resources that the MRCS 200 will require for its operation. The MM 260 can also manage the plurality of external databases (CDB 142 (FIG. 1) and MP4MR-DB 144 (FIG. 1)), for example) or internal databases (CDB 230 and MP4MR-DB 250). An exemplary embodiment of the MM 260 can periodically scan the tables CDB-T and/or MP4DB-T and delete old files that are no longer required (i.e. files which are not frequently requested or have not been requested for a threshold period of time, etc.). The MM 260 can communicate with other servers in the ANOP 130 (FIG. 1) to receive management information and/or for communication status and control data.

In addition, an embodiment of the MM 260 may scan the CDB-T looking for a next MPEG-4 file to be trans-rated. The decision pertaining to which MPEG-4 file to trans-rate can be based on a variety of factors. A few non-limiting examples of such factors may include the number of times the file has been downloaded (requested), the aging of the file, etc. After selecting the next file to be trans-rated, the MM 260 can copy a section of the CDB-T that is related to the selected file and load it into the VPM 242 to be used as VPM table (VPM-T). The information includes data about the location in the CDB 230 in which the MPEG-4 file is stored. In addition, a section in the MP4MR-DB 250 is allocated for storing the common metadata that serves the two or more trans-rated files and for storing each one the trans-rated MPEG-4 files.

A table can be created at MP4TP 240. The table can include information on the original MPEG-4 file, such as the signature that is associated with the original MPEG-4 file. The signature can be used for associating the trans-rated files with the original file. Information regarding the media file can also be stored, such as the original bit-rate, compression standard, size, play duration, etc. of the media file.

At this point of time, the MP4TP 240 can start the trans-rating process of the selected original MPEG-4 file. Each one of the two or more H.264 encoders 244 is set to compress the video file in a different bit-rate (BRa, BRb, and BRn). The different bit rates can be 300 Kb/s; 168.75 Kb/s; 62.5 Kb/s, as non-limiting examples. Video encoders/decoders are well known in the art and will not be further described. A reader who wishes to learn more about video codecs and MPEG-4 containers is invited to read compression standards such as MPEG-4, H.264/AVC and AVS. The information can be found in the International Telecommunication Union ("ITU") website: www<dot>itu<dot>int or in www<dot>mpeg<dot>org, for example.

Based on the VPM-T, the VPM 242 may retrieve from the CDB 230 the metadata of the original MPEG-4 file. Information from the metadata can be used by the decoder that is embedded in the VPM 242, by each one of the H.264 encoders 244 and by the MDP 246. After retrieving the metadata, the video data of the file is retrieved one frame after the other from the CDB 230 by VPM 242, decoded by the embedded decoder of the VPM 242 and be placed in a frame memory at the output of the VPM 242 with associated information about the original frame. The information about the original frame may include information such as frame-number, frame type (Intra or Inter), offset in time from the beginning of the file. Each one of the H.264 encoders 244 can obtain the decoded frame with the associated information, and compress it according to the type of the original frame (Intra or Inter) and according to the configured bit-rate of that encoder. The encoded frame and its associated information can be transferred toward the MDP 246.

For each video frame obtained from the two or more encoders 244, an example embodiment of the MDP 246 may compare each compressed frame in a stream with a respective compressed frame in the other one or more streams. The MDP 246 can add stuffing to equalize the size of respective frames in the different streams. Thus, in the two or more compressed video streams at the output of the MDP 246, each respective compressed frame of a certain video frame has the same number of bytes although the frames were compressed in a accordance to different bit-rate. The stuffing can be bytes of all zero bits or all one bits (ie. 00 or FF base 16) or other consistent value that is easily compressed.

Then a single metadata is created that fits the two or more streams having the stuffing. Because of the stuffing, in each compressed stream the offset of respective frames from the beginning of the file is the same. The location of similar, respective, frames in the two or more streams is the same although the streams were compressed in accordance with different bit rates. Because of the stuffing, the created metadata fits the two or more compressed streams at the output of the MDP 246. The metadata can be created according to the relevant file container standard. An example of a container file can be MPEG-4 which is well known to a person with an ordinary skill in the art.

The created metadata of the file with information related to that file can be stored in the MP4MR-DB 250 in the location which was allocated by the MM 260. Information related to that file can be such as, but not limited to, the signature of the original media file that was retrieved from the CDB 230. The relevant entry in the MP4DB-T can be updated too.

Each compressed frame of each stream at the output of the MDP 246, is stored in the relevant section of the MP4MR-DB 250 and the location of the frame, as well as information on that frame, is stored in the relevant line and column of the MP4DB-T. The information about the frame can include the frame type, Intra or Inter, the offset of the beginning of the frame in time and/or bytes from the beginning of the file, etc. While a trans-rated file is retrieved from the MP4MR-DB 250, it is transferred via an LLE 252 to reduce the effect of the stuffing on the BW consumption. The LLE 252 can losslessly compress the currently retrieved trans-rated MPEG-4 file that is transferred to the requester via DH 224 and HTTP proxy 210.

The MP4DB-T can comprise a plurality of rows and columns. Each row can be associated with a frame number (audio or video). Each column along that row can store information that is related to that frame. Information in the MP4DB-T may include, but is not limited to: the type of the media (audio, video), the type of the frame (Intra or Inter), the size of the frame, the starting time in which the frame is played, etc. The following columns, one per each trans-rated copy of the MPEG-4 file, can point on the location of that frame, of that trans-rated copy of the MPEG-4 file, in the MP4MR-DB 250.

After handling the last frame of the current processed MPEG-4 file, an exemplary MP4TP 240 can update the MM 260 with information related to the updated MP4DB-T and requests the MM 260 to point on a next media file to be trans-rated by the MP4TP 240, and so on.

Another exemplary embodiment of the MP4TP, not shown in the drawings, can operate in a serial mode instead of parallel mode as it is illustrated in the example of FIG. 2. Such a serial MP4TP can have a single video encoder. In such an embodiment, a selected media file can be retrieved from the CDB 230 several times in serial and each time, the file is encoded in accordance to a different bit-rate. During the first trans-rating, the file can be trans-rated according to the highest bit-rate. Thus, each frame of this trans-rated file will have the largest number of bytes compared to respective frames that would be compressed in accordance with a lower bit-rate. The number of bytes of each frame of this trans-rated file (compressed in accordance to the highest bit-rate) is stored by an MDP and be used as a reference size for respective frames in the following trans-rated files that will be compressed in accordance to lower one or more bit-rates.

For each frame in each of the following trans-rated streams, the MDP can add stuffing to equalize the number of bytes in that frame to the stored number of bytes in the respective frame of the highest bit-rate stream.

In some embodiments, the MP4TP can be installed in a web site that creates the MPEG-4 file. In such embodiments, the VPM 242 may not include a decoder. Each created video image, from a video camera for example, can be stored by the VPM 242 and be processed by the following elements of the MP4TP, elements such as the two or more video encoders 244, and the MDP 246.

Figure 3:
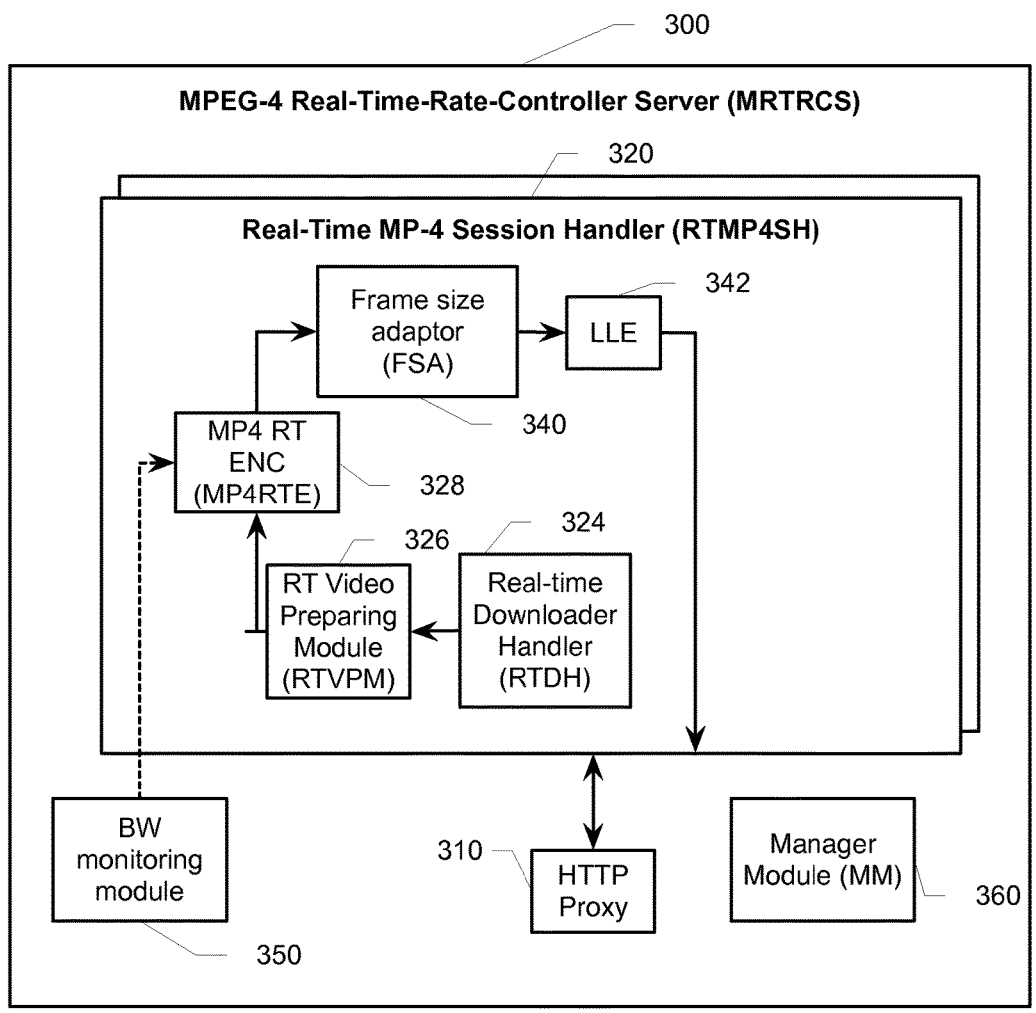
FIG. 3 illustrates a block diagram with relevant elements of an example of an MPEG-4 Real-Time-Rate-Controller Server (MRTRCS), according to the teaching of the present disclosure.

FIG. 3 illustrates relevant elements of an example of an MP4-Real-Time-Rate-Controller server (MRTRCS) 300. Among other elements, an embodiment of the MRTRCS 300 can comprise an HTTP proxy 310, a plurality of Real-Time-MP4-Session Handler (RTMP4SH) 320, a manager module 360, and a BW monitoring module 350. The BW monitoring module 350 can operate in a similar way to the operation of the BW monitoring module 270 (FIG. 2), which is disclosed above. An example of an RTMP4SH 320 can comprise a real-time-downloader handler (RTDH) 324, a real-time-video-preparing module (RTVPM) 326, an MP4-real-time-encoder 328, frame-size adaptor (FSA) 340 and an LLE 342. An embodiment of LLE 342 can operate in a similar way to the operation of LLE 252 that is disclosed above in conjunction with FIG. 2.

An example of an HTTP proxy 310 can be a transparent HTTP proxy. Various embodiments of the HTTP proxy 310 can be configured to obtain IP packets of responses received from a plurality of servers located at the Internet 154 (FIG. 1) or at the Intranet 152 via BGW 138 (FIG. 1). The responses are targeted toward a plurality of surfers using SE 110 (FIG. 1). For each received packet, the HTTP proxy 310 can process the received packets. Based on the header of the packet, the HTTP proxy 310 can determine whether the packet carries a container file that includes a compressed media file, for example. An example of such a container file can comply with MPEG-4 protocols. If the packet does not carry MPEG-4 data, then the packet can be transferred as is toward its destination.

If the packet carries an MPEG-4 file, then based on the source IP address and the destination IP address (the server IP address and the surfer's IP address, respectively), for example, the HTTP proxy 310 can determine whether an RTMP4SH 320 has been allocated for that session. If an RTMP4SH 320 has been allocated, then the packet can be transferred toward an RTDH 324 of the appropriate RTMP4SH 320. If no RTMP4SH 320 exists for that session, the HTTP proxy 310 can request the Manager Module 360 to create an RTMP4SH 320 for the specific session. The allocated RTMP4SH 320 can be associated with the session based on the IP address of the surfer and the IP address of the relevant server. The HTTP proxy 310 can manage a table that associates the IP address of the surfer and the IP address of the relevant server with the allocated RTMP4SH 320. In addition, the HTTP proxy 310 can update a relevant entry in the session with the time in which the last transaction occurred in that session.

In the other direction, the HTTP proxy 310 can receive packets carrying trans-rated MPEG-4 files from the plurality of RTMP4SH 320. The HTTP proxy 310 can process the received packets according to the protocols of first three layers of the OSI and send the trans-rated MPEG-4 file toward its destination.

After initiation, an embodiment of a RTDH 324 can be configured with the value of the estimated bit-rate over the connection (CBR) with the SE 110, which is the destination of that session. Then the RTDH 324 can wait to receive the beginning of a new MPEG-4 file. The first one or more packets received from HTTP proxy 310 can carry metadata that is related to the current downloaded MPEG-4 file and is associated with that RTDH 324. The RTDH 324 can process the metadata to retrieve the value of the bit-rate that was used to compress the obtained MPEG-4 file. This bit-rate can be referred to as the original bit-rate (OBR).

Further, the RTDH 324 can search the metadata looking for the largest-Intra frame (LIF), the Intra frame that has the maximum number of bytes, as well for the largest-Inter frame (LPF), the Inter frame that has the maximum number of bytes. Based on the found values of LIF and LPF and base on the ratio between the estimated CBR, and the OBR, the RTDH 324 can calculate a fix size for a trans-rated Intra frame (FSIF) and a fix size for a trans-rated Inter frame (FSPF). For example, an FSIF can be calculated as the value of LIF multiplies by the CBR divided by the OBR and multiplied by a factor. The factor can be larger than one and smaller than two, for example. In a similar way, an FSPF can be calculated as the value of the LPF multiplied by the CBR divided by the OBR and multiplied by the same factor or a similar one. The values of the FSIF and FSPF can be loaded to the H.264 encoder 328 and to the FSA 340.

In other embodiments of the MRTRCS 300, a constant value for FSIF and another constant value for FSPF can be used for all the received MPEG-4 files. The constant values can be determined as a result of observation of the MPEG-4 traffic over a plurality of connections to the SE 110. Based on those observations, a conclusion can be reached that the value of 5,000 bytes for FSIF covers the size of most of the Intra frames that were observed. In a similar manner, the value of 1000 bytes for FSPF covers the size of most of Inter frames that were observed. Such embodiments can use those constant values for configuring the RTDH 324, the H.264 encoder 328 and FSA 340. In such embodiments, the constant value can be calculated as a function of the resolution of the file, or the resolution of the device's screen at the destination of the file, for example. Yet other embodiments, from time to time may update the constant values of FSIF and FSPF in accordance to new observations.

An example of the RTDH 324 may further manipulate the original received metadata to match the values of FSIF and FSPF. The offset value of each frame can be changed to reflect the number of preceding Intra frames multiplied by FSIF plus the number of preceding Inter frame multiplied by FSPF. In addition, the size of each frame in the metadata can be adapted to its type, FSIF or FSPF. The manipulated metadata can be transferred toward the associated SE 110 (FIG. 1) via proxy 310. In addition the manipulated metadata can be transferred to the FSA 340.

MP4 packets that follow the metadata are transferred via proxy 310 and RTDH 324 to the RTVPM 326. An embodiment of the RTVPM 326 can be configured to arrange the received packets according to their sequence number and/or time stamp. In addition, the RTVPM 326 can comprise an H.264 decoder. The decoder can decode compressed video frames carried by the organized compressed packets. The decoded video data can be placed in a frame memory at the output of the RTVPM 326 with associated information about the original frame, information such as frame-number, frame type (Intra or Inter), offset in time from the beginning of the file, etc.

Some embodiments of the MRTRCS 300 can be installed in a web site that creates the MPEG-4 file. In such embodiments, the RTVPM 326 may not include a decoder. Each created video image, from a video camera for example, can be stored by the RTVPM 326 and be processed by the following elements of the RTMP4SH 320, elements such as the MP4 real-Time encoders 328, the FSA 340 and the LLE 342.

In addition to a common operation of the H.264 encoder, an example of an MP4-real-time encoder (MP4RTE) 328 may have additional functionality. The additional functionality can be related to controlling the bit-rate of the compression and the maximum compressed frame size. Further, an exemplary MP4RTE 328 may have bit-rate-management section that obtains, from the BW monitoring module 350, an indication on the currently available BW over the relevant connection. Accordingly, the bit-rate-management section can adapt the current compression bit rate to the currently available BW. To maintain the size of a compressed Intra frame below the calculated FSIF and the size of a compressed Inter frame below the value of FSPF, which were received from the RTDH 324, an exemplary MP4RTE 328 may progressively reduce the compression quality of a frame when a current compressed frame size come close to the FSIF or FSPF (for Intra frame or Inter frame, respectively).

During operation, one frame at a time, the MP4RTE 328 can obtain a decoded frame with the associated information from the frame memory at the output of RTVPM 326, and compress it according to the type of the original frame (Intra or Inter) and according to the current available BW, which was obtained by the bit-rate-management section of the MP4RTE 328, while progressively keeping the size of the compressed frame below FSIF or FSPF. The encoded frame and its associated information can be transferred toward the FSA 340.

An exemplary FSA 340 may obtain from the RTDH 324 the modified metadata, the value of FSIF and FSPF. Then, for each obtained compressed frame from the MP4RTE 328 and its associated data, the FSA 340 can compare the size of the received compressed frame, Intra or Inter, to the values of FSIF or FSPF, respectively. The FSA 340 can add stuffing to equalize the size of the compressed frame to one to the appropriate value, FSIF or FSPF. Thus, at the output of FSA 340, compressed Intra frames will have the size of FSIF bytes, and compressed Inter frame will have the size of FSPF bytes, independently on the compression bit-rate or quality. The stuffing can be bytes of zero, FF, etc.

Each compressed frame at the output of the FSA 340 can be transferred via an LLE 342 to reduce the effect of the stuffing on the BW consumption. The lossless compressed frame from the LLE 342 can be transferred to the requester SE 110 (FIG. 1) via the HTTP proxy 310.

An exemplary embodiment of the MM 360 can allocate a plurality of resources that are needed by the MRTRCS 300. An example of resources can be the resources for a new RTMP4SH 320 associated with a new session. Further, the MM 360 can communicate with other servers in the ANOP 130 (FIG. 1) for management information and/or for communication status and control data. Furthermore, from time to time, some embodiments of the MM 360 may check the table of the HTTP proxy 310 to identify any sessions for which the time period from the last transaction is longer than a certain threshold. Each found session can be assumed to be an inactive session and the resources of its associated RTMP4SH 320, as well as the entry in the table of the HTTP proxy 310 can be released. The threshold can be in the range of few tens of seconds to few minutes, 30 second for example.

Figure 4:
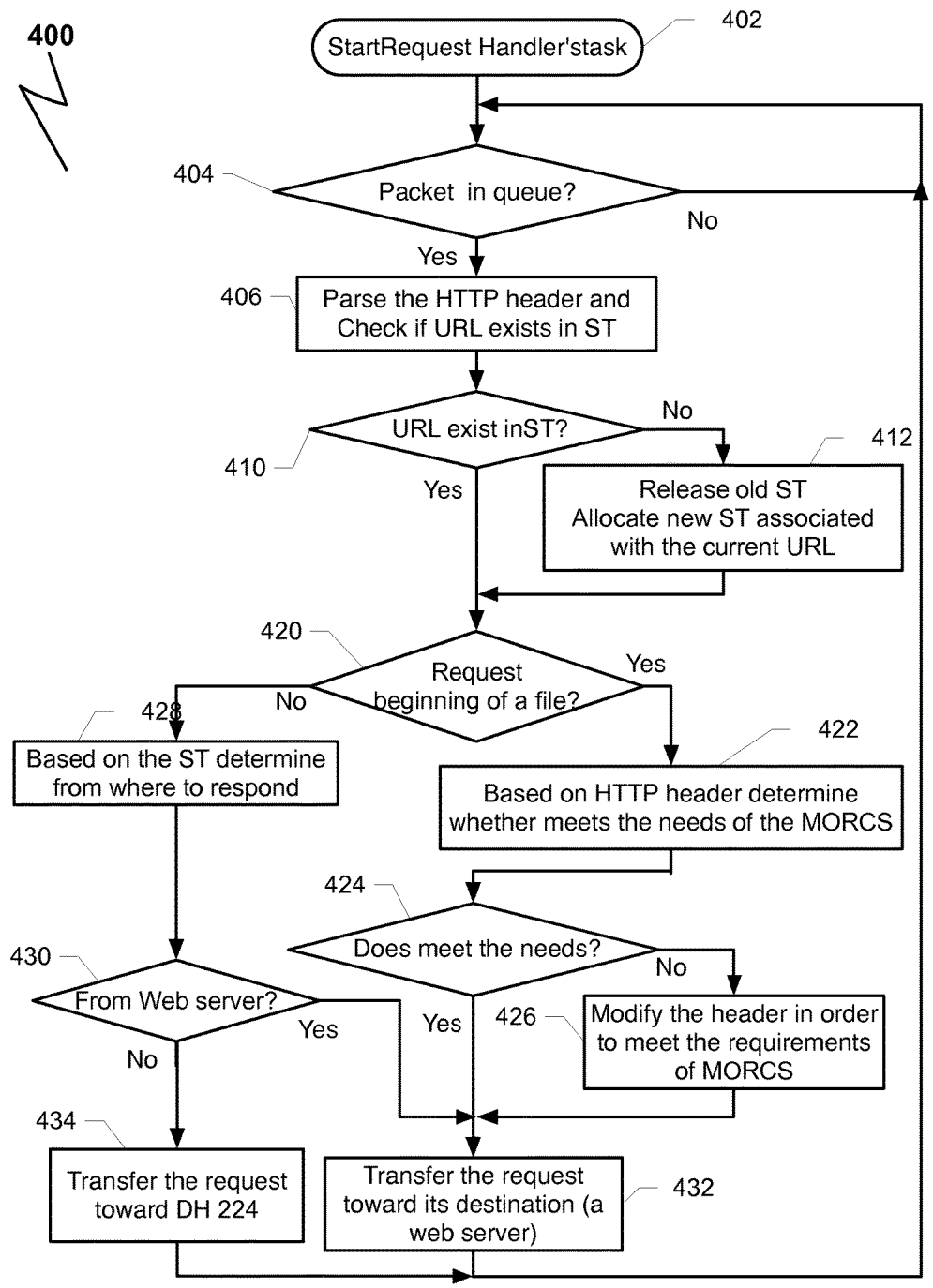
FIG. 4 illustrates a flowchart with relevant actions of a process for handling a request by an example of MPEG-4 Offline-Rate-Controller Server.

FIG. 4 illustrates a flowchart with relevant actions of an exemplary handling process 400 of a request for an MPEG-4 file, wherein the request is received from a surfer using SE 110 (FIG. 1). The process 400 can commence upon initiating the relevant MP4SH 220 (FIG. 2) and be executed 402 by the RH 222 (FIG. 2), as a non-limiting example.

Upon initiation, the queue at the ingress of RH 222 can be checked 404 for determining whether any packets are queued up. If 404 no packets are in the queue, then the process 400 can wait until a packet is placed into the queue. If 404 a packet exists in the queue, the HTTP header of the packet can be parsed 406 and based on the URL the ST 226 (FIG. 2) can be checked to determine whether the ST 226 (FIG. 2) is associated with that URL. If the ST 226 is associated with that URL 410, then the process 400 can proceed to block 420. If 410 there is no entry associated with that URL, then at block 412 the old ST 226 is released and a new one is allocated 412 and is associated with that URL. Relevant fields in the ST 226*b* can be updated, such as updating the requesting time field, for example. Alternatively, a new ST 226 can be allocated for the session with that URL.

At block 420 a decision is made whether (a) the request is from a beginning of a file, (b) a request for following chucks of data or (c) a seek request. If 420 the request is not from a beginning of a file, then based on information 428 retrieved from the relevant field of the ST 226, a decision can be made 430 whether to fetch the response from a web server. If the response is to be fetched from a web server 430, then the request is transferred 432 toward the destination web server via proxy 210 (FIG. 2) and the process returns to step 404 waiting to a next packet. If the response is not to be fetched from a web server 430, then the request is transferred toward a queue of DH 224 for further processing and method 400 returns to step 404 waiting to the next packet.

If the decision received at block 420 is that the request is for fetching video content from the beginning of a media file, such as an MPEG-4 for example, then at block 422 the HTTP header is parsed to determine if the HTTP header meets the MORCS 200 requirements (i.e., does the field in the HTTP header that defines the amount of bytes that will be received from the destination meet a pre-defined number of bytes). An exemplary pre-defined number of bytes can be the N number needed to perform a hash operation (signature). An exemplary N can be 8 Kbytes, for example.

If 424 the HTTP header of the packet meets the MORCS 200 (FIG. 2) requirements, then the packet can be sent 432 toward its destination, such as a web server for example. Next the process 400 can continue to examine the queue for the next packet 404. If 424 the HTTP header of the packet does not meet the MORCS 200 requirements, then the header can be modified 426 to meet the requirements. Exemplary modifications can include changing the requested number of bytes in the appropriate field of the header as a non-limiting example. Next the modified packet can be sent 432 toward its destination and the process 400 can continue to examine the queue for the next packet 404.

Figure 5A:
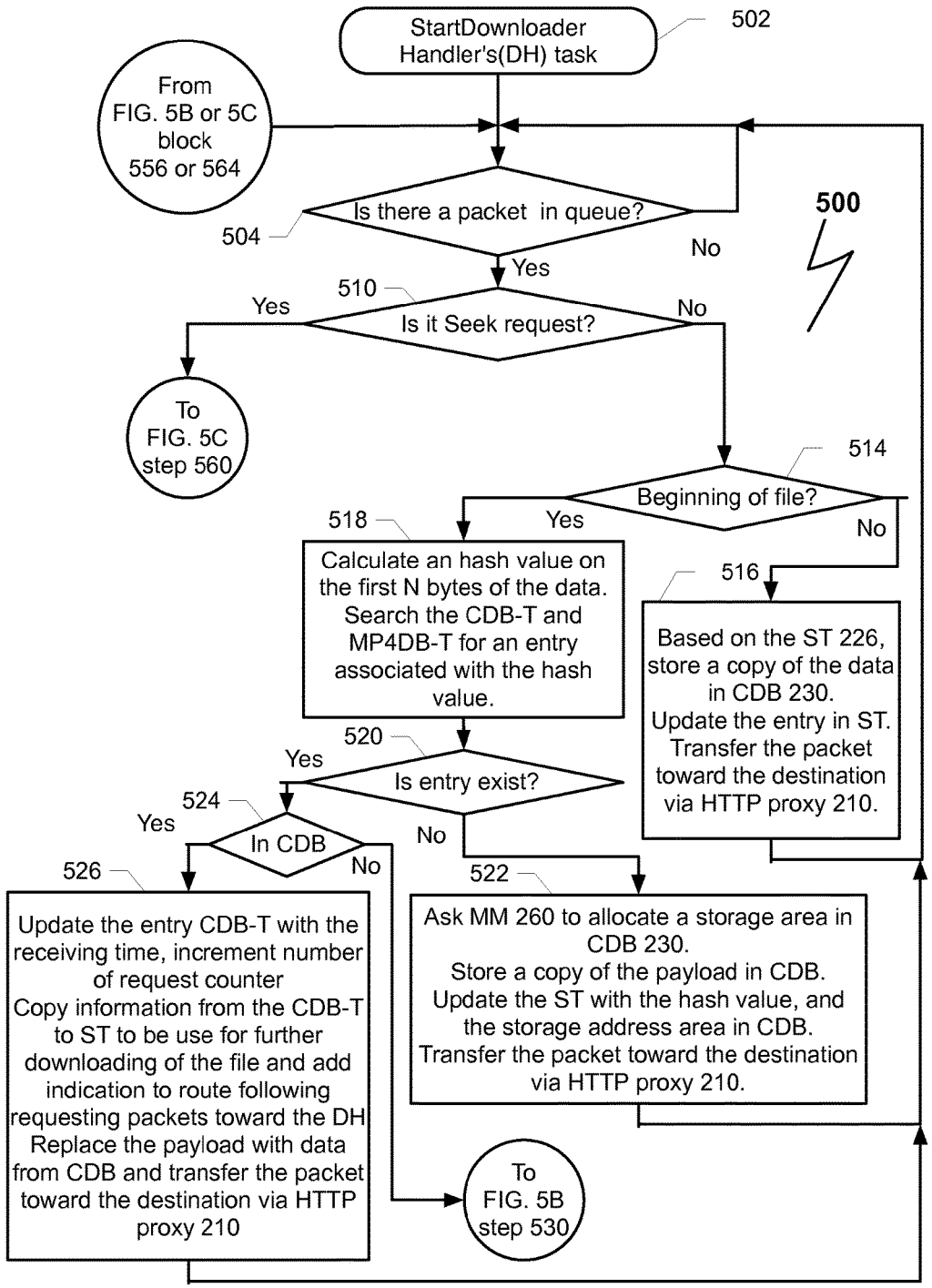
FIGS. 5A, 5B and 5C illustrate a flowchart with relevant actions of a process of a downloader handler in an example of MPEG-4 Offline-Rate-Controller Server.
Figure 5B:
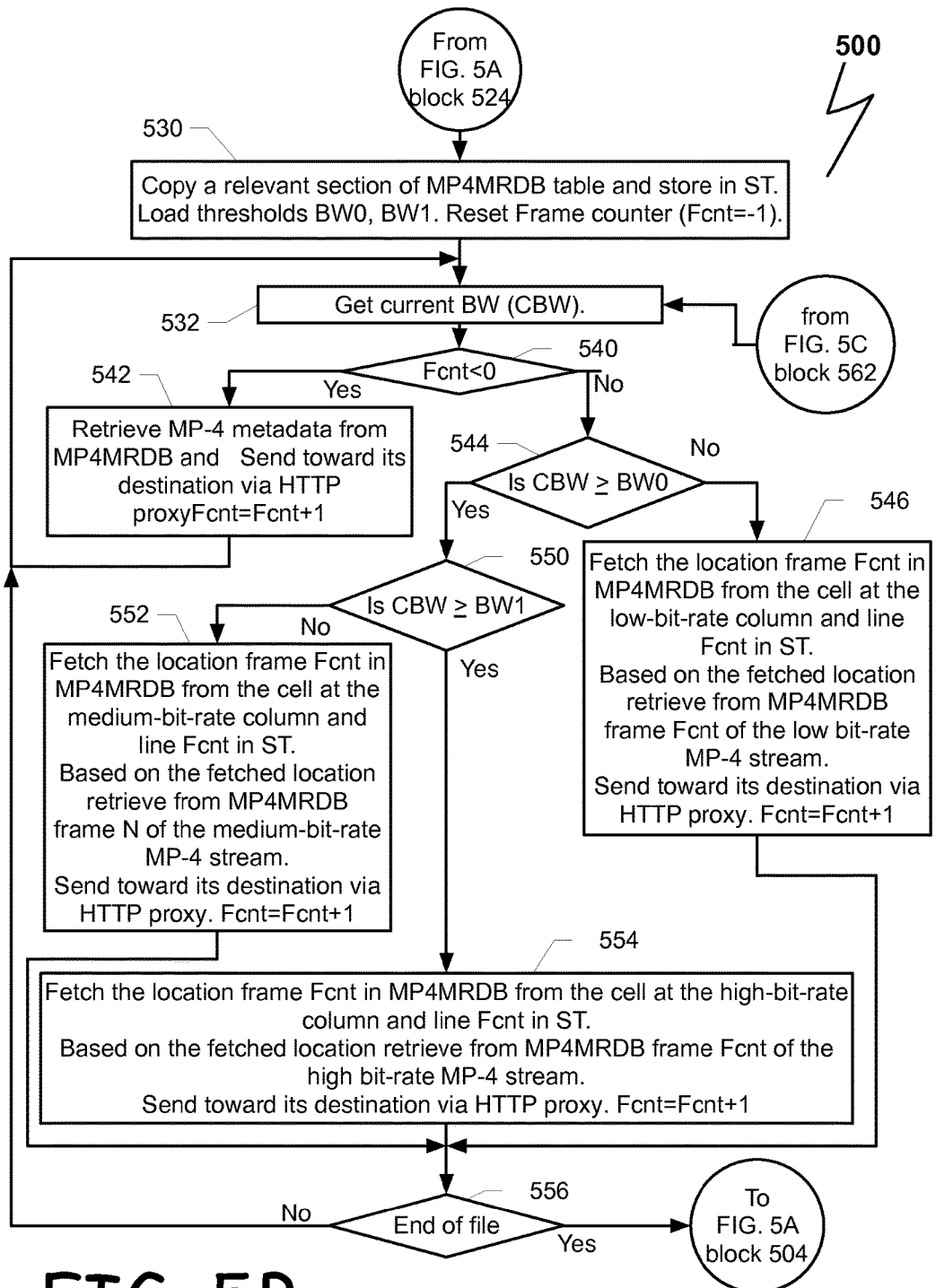
Figure 5C:
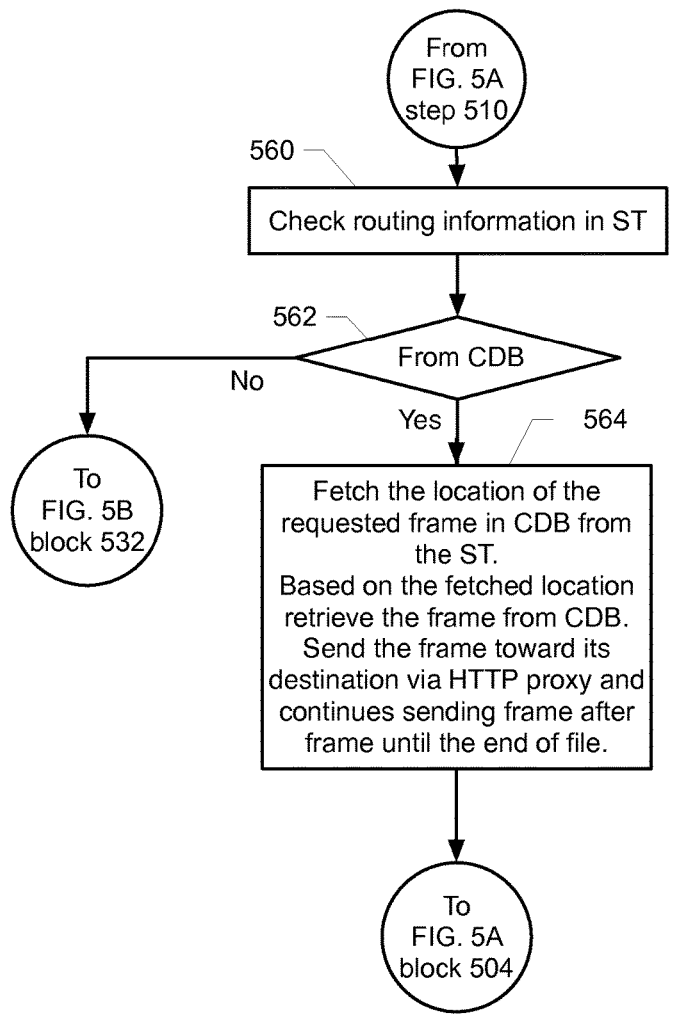

FIG. 5A, FIG. 5B and FIG. 5C illustrate a flowchart with relevant actions of a method or technique 500 for handling MPEG-4 packets that have been received from a web server and that are targeted toward a requesting SE 110 (FIG. 1). The method or technique 500 also responds to requests received from an SE 110 (FIG. 1) for MPEG-4 files that are stored in CDB 230 or MP4MR-DB 250 (FIG. 2). The process 500 can commence upon initiating the relevant MP4SH 220 (FIG. 2) and be executed 502 by the DH 224 (FIG. 2), for example.

Upon initiation, the queue at the ingress of the DH 224 can be checked 504 to determine whether any packets are queued up. If 504 no packets are in the queue, then the process 500 can wait until a packet is placed into the queue. If 504 a packet exists in the queue, then a decision is made 510 whether the received packet is a seek request. If the received packet is a seek request, the queued packet is handled as a seek request received from an associated SE 110 and can be routed to DH 224 by the RH 222. As illustrated previously in block 434 of FIG. 4, the request is routed toward the DH 224 because it requests a file that is stored in one of the two databases CDB 230 or MP4MR-DB 250 (FIG. 2). In such a case, the process 500 proceeds to block 560 in FIG. 5C to retrieve the requested data chunks from the appropriate DB to be sent toward the requesting SE 110.

If 510 the queued packet is not a seek request but rather, carries data chunks of a compressed media file, then a decision is made 514 as to whether the payload includes the beginning of the relevant media file. If 514 it is not the beginning of the relevant media file, then it is concluded that the packet is part of an ongoing process of downloading the media file such as MPEG-4 file. In such a scenario, the ST 226 (FIG. 2) is consulted 516 to determine where in the CDB 230 to store the copy of the received-compressed-media-data chunks. In parallel, or after storing the copy of the received data, the ST 226 can be updated 516 with information related to the received data chunks and the location at CDB 230 in which the information was stored.

After updating the ST 226, a decision can be made whether the received data chunk includes the end of file. If not, the received packet is transferred toward its destination, the requesting SE 110, via HTTP proxy 210 (FIG. 2) and method 500 returns to block 504. If the received payload includes an end of file (EOF) indication, then the ST 226 can be copied to CDB-T to an entry that is associated with that file. The association can be based on the hash value, which may be calculated on the first predefine number of bytes from the beginning of the media file as a non-limiting example. After copying the ST 226, the received packet is transferred 516 toward its destination, the requesting SE 110, via HTTP proxy 210 (FIG. 2). Then method 500 returns to block 504. In some embodiments the ST 226 can be released, while in other embodiments, the ST can be kept for responding to seek requests and be released by MM 260 (FIG. 2) after a certain silence period.

Returning now to block 514, if the payload includes the beginning of the compressed media file, then a hash value can be calculated 518 on the first predefine number of bytes (N) from the beginning of the media file. The value of N can be in the range of a few thousands of bytes (2,000 to 15,000 bytes as a non-limiting example). In some embodiments, the first 8000 bytes are used for calculating the hash value. The hash value can be calculated 518 by a hash function such as MD5. Other embodiments may use other hash functions such as, but not limited to: MD4, SHA-1, SHA-2, etc. The calculated hash value can be used as the signature of the media file. Based on the calculated signature, the CDB-T and the MP4DB-T can be searched 518 looking for an entry that is associated with the calculated signature.

If 520 there is no entry in the CDB-T or in the MP4DB-T that is associated with the calculated signature, then at block 522, the MM 260 (FIG. 2) is requested to allocate a storage volume in the CDB 230 for storing the relevant media file. Then, a copy of the payload can be stored 522 in the allocated area in CDB 230. The ST 226 can be updated with the value of the calculated hash as the signature of that file, in addition the addresses in which the payload was stored in CDB 230 can be written in the ST 226 as well as information relating to the received file. After updating the ST 226, the received packet is transferred 522 toward its destination, the requesting SE 110, via HTTP proxy 210 (FIG. 2) and method 500 returns to block 504.

If 520 there is an entry in the CDB-T or in MP4DB-T that is associated with the calculated signature, then at block 524 a decision is made whether the found entry is in CDB-T. If 524 there is an entry in CDB-T, indicating that the file is stored in the CDB 230 (FIG. 2), then at block 526 the relevant entry in CDB-T is updated with the receiving time. In addition, the field that counts the number of requests that were received for that media file is incremented. Those two fields can be used by the MM 260 for determining which media file will be trans-rated next or which media file will be released from the CDB 230.

Next, the relevant entry from the CDB-T that is associated with that hash value can be copied 526 to the ST 226 of the relevant MP4SH 220 (FIG. 2). The updated ST 226 can be used by the DH 224 during the download process of the media file. In addition, a routing indication can be written in the relevant field of the ST 226 for informing the associated RH 222 to route following request packets of this session to the associated DH 224. Finally, the received payload is deleted from the packet. Based on the updated ST 226, the requested file is downloaded from the CDB 230 (FIG. 2). The beginning of the cached media file is fetched from the CDB 230 and is transferred toward the requesting SE 110 via HTTP proxy 210, one compressed data chunk after the other until the end of the file. The method 500 then returns to block 504 looking for the next packet.

If 524 it is determined that there is no entry in the CDB-T that is associated with the calculated hash value, then process 500 proceeds to block 530 and fetches the data from the MP4MR-DB 250 (FIG. 2) as is illustrated in FIG. 5B. At block 530, the relevant entry in the MP4DB-T is updated with the receiving time. In addition, the field that counts the number of requests that were received for that media file is incremented. Those two fields can be used by the MM 260 for determining which media file will be released from MP4MR-DB 250.

Next, the relevant entry from the MP4DB-T, which is associated with that hash value, can be copied 530 (FIG. 5B) to the ST 226 of the relevant MP4SH 220 (FIG. 2). The updated ST 226 can be used by the DH 224 during the download process of the media file. In addition, a routing indication can be written in the relevant field of ST 226 for informing the associated RH 222 to route following request packets of this session to the associated DH 224. Two or more BW threshold values (BW0 & BW1) can be loaded to the ST 226 from the MM 260. A frame counter field in the ST 226 (Fcnt) can be set to minus one (−1). Finally, the received payload is deleted from the packet.

After the update, the ST 226 can comprise a plurality of rows and columns. Each row can be associated with a frame number (audio or video). Each column along that row can store information that is related to that frame. Information such as, but not limited to: the type of the media (audio, video), the type of the frame (Intra or Inter), the size of the frame, the starting time in which the frame is played, etc. The following columns, one column for each trans-rated copy of the MPEG-4 file, can point on the location of that frame, of that trans-rated copy of the MPEG-4 file, in the MP4MR-DB 250.

At block 532, the currently available BW (CBW) over the connection toward the relevant SE 110 can be obtained from the BW monitoring module 270 (FIG. 2). At block 540, a decision is made as to whether Fcnt is smaller than zero. If

540 Fcnt is less than zero, then based on information stored at the ST 226, the metadata that is associated with that file is retrieved 542 from the MP4MR-DB 250 (FIG. 2) and is sent toward the requesting SE 110 via HTTP proxy 210. Then, Fcnt can be incremented by 1, and the process 500 returns to block 504 (FIG. 5A) looking for the next packet in the queue.

If 540 Fcnt is not smaller than zero, then a decision can be made as to whether 544 the CBW is equal or larger than the first threshold, BW0. If 544 the CBW is smaller than BW0, then at block 546 the ST 226 is searched for a cell in the junction of the row that is associated with frame number Fcnt and the column that is associated with the trans-rated copy of the MPEG-4 file, which was compressed according to the lowest bit-rate corresponding with BW0. The content of that cell points on the addresses in MP4MR-DB 250 from which the compressed data with the lowest bit-rate of that frame can be fetched 546 and sent toward the requesting SE 110 via HTTP proxy 210. Then, the Fcnt can be incremented by one and a decision is made 556 whether the end of file was reached. If 556 the end of the file is reached, then the process 500 can return to block 504 (FIG. 5A). If 556 the end of the file has not been reached, then the process 500 can return to block 532 for sending the next frame.

If 544 the CBW is equal or larger than BW0, then a decision is made as to whether 550 the CBW is equal or larger than the second threshold, BW1. If 550 the CBW is greater than threshold BW1, then at block 554 the ST 226 is searched for a cell in the junction of the row that is associated with frame number Fcnt and the column that is associated with the trans-rated copy of the MPEG-4 file, which was compressed according to the highest bit-rate. The content of that cell points on the address in the MP4MR-DB 250 from which the compressed data with the highest bit-rate of that frame (Fcnt) can be fetched 554 and sent toward the requesting SE 110 via HTTP proxy 210. Then the Fcnt can be incremented by one and a decision is made 556 whether the end of file was reached. If 556 the end of the file was reached, then the process 500 can return to block 504 (FIG. 5A). If 556 the end of the file was not reached, then the process 500 can return to block 532 for sending the next frame.

If 550 the CBW is smaller than the threshold BW1, then at block 552 the ST 226 is searched for a cell in the junction of the row that is associated with frame number Fcnt and the column that is associated with the trans-rated copy of the MPEG-4 file, which was compressed according to a medium bit-rate. The content of that cell points on the addresses in MP4MR-DB 250 from which the compressed data with the medium bit-rate of that frame (Fcnt) can be fetched 554 and sent toward the requesting SE 110 via HTTP proxy 210. Then the Fcnt can be incremented by one and a decision is made 556 as to whether the end of file was reached. If 556 the end of the file was reached, then the process 500 can return to block 504 (FIG. 5A). If 556 the end of the file is not reached, then the process 500 can return to block 532 for sending the next frame.

Returning to block 510 in FIG. 5A, if the received packet is a seek request, then the process 500 proceeds to block 560 in FIG. 5C to retrieve the requested data chunks from the appropriate DB to be sent toward the requesting SE 110. At block 560, the field of the routing information is fetched from ST 226 and a decision is made 562 whether the requested file is delivered from CDB 230 or from MP4MR-DB 250.

If 562 the file is to be delivered from the MP4MR-DB 250, then the process 500 proceeds to block 532 in FIG. 5B while adapting the Fcnt to the seek request. If 562 the file is to be delivered from the CDB 230, then the ST 226 is searched 564 for a cell in the junction of the row that is associated with requested frame and the column that is associated with the cached copy of the MPEG-4 file, which was stored in CDB 230. The content of that cell points on the addresses in the CDB 230 from which the compressed data of the requested frame can be fetched 564 and sent toward the requesting SE 110 via HTTP proxy 210. Then the ST 226 is updated and a decision can be made whether the end of file was reached. If the end of the file has been reached, then the process 500 can return to block 504 (FIG. 5A). If the end of the file has not been reached, then the process 500 can continue and send one compressed data chunk after the other until the end of file. After reaching the end of file the process 500 can return to block 504.

Figure 6:
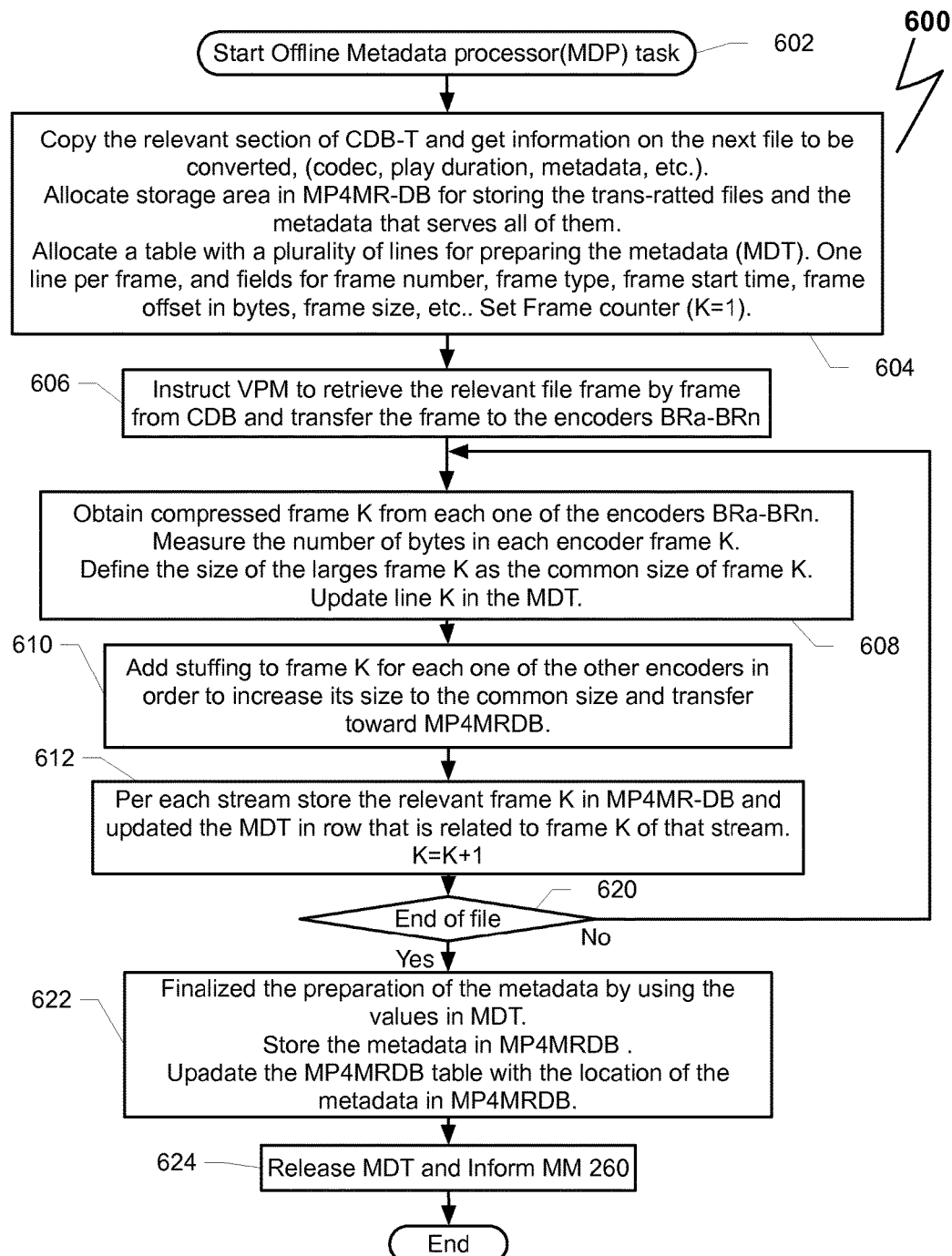
FIG. 6 illustrates a flowchart with relevant actions of a process of a metadata processor (MDP) of an example of MPEG-4 Offline-Rate-Controller Server.

FIG. 6 is a flow diagram illustrating relevant actions of an exemplary process 600 that can be implemented by a metadata processor (MDP) 246 (FIG. 2) of an exemplary MORCS 200. The process 600 can be initiated 602 by the MDP 246 upon receiving instruction from the MM 260 (FIG. 2) to start trans-rating a next cached MPEG-4 file from CDB 230. After initiation at block 604, a section of the CDB-T that is related to that cached compressed media file is copied to the MDP 246. From the copied section, information regarding the file and its metadata is collected 604. Information about the Codec, duration of play, the metadata information related to each frame, etc. Information such as the type of frame (Intra or Inter), the offset in time for playing the beginning of the frame, the offset in bytes, etc.

Storage places in the MP4MR-DB 250 (FIG. 2) can be allocated for storing a new metadata file, which will be used for the two or more trans-rated files and space for storing the trans-rated file themselves. A metadata table (MDT) can be prepared 604 for storing information pointing on the storage location of the new metadata and the two or more trans-rated MPEG-4 files in MP4MR-DB 250. In addition, information from the metadata of the cached MPEG-4 file (the original file) can be processed for preparing the MDT. An exemplary MDT can comprise a plurality of rows and a plurality of columns. Each row can be associated with a frame. The first few columns can store general information relating to the relevant frame per each row along the column. The general information related each frame may include information such as: frame type (Intra or Inter), offset in time for start playing the frame, the play duration, etc. Each of the columns following the general ones can store information related to a certain trans-rated copy of the original MPEG-4 file. For each cell along a certain column of a certain trans-rated file, the offset in bytes of that frame from the beginning of compressed media of that trans-rated file can be stored. At the end of the preparation the MDP 246 can set a frame counter K to one (K=1). It should be appreciated that although the structure of the MDT has been described in a particular manner, the exact structure presented is only one method of organizing the data required for the various embodiments of the bit rate adjuster. Those skilled in the art will appreciate that any of a variety of database styles, structures, techniques, information retrieval technologies, etc. may also be used.

At the end of the preparation, an instruction can be sent 606 to the VPM 242 (FIG. 2) to obtain one compressed frame after the other from the CDB 230, starting from the first Intra frame. The instruction can include the location in CDB 230 from which the compressed data is retrieved. The location information can be concluded from the copy of the relevant section of the CDB-T. The VPM 242 can decode each obtained compressed frame and the decoded frame can transferred to an input buffer of each one of the H.264 encoders BRa to BRn. Each encoder compresses the decoded frame in a different bit-rate. In addition the original type of the frame (Intra or Inter) is reserved.

The current compressed frame, from each encoder 244, can be referred to as frame K. Per each compressed frame K, the MDP 246 can count 608 the number of bytes in frame K at each trans-rated bit-rate stream. The number of bytes in the largest frame K can be defined as the common size of that frame; frame K. Usually frame K at the output of the highest bit-rate encoder 244 is the largest frame. The value of the common size can be written 608 in the row that is related to frame K in the MDT.

At block 610 stuffing can be added to frame K of each one of the other streams, which were compressed in other bit-rates, to equalize the number of bytes of their compressed frame K to the common value of frame K. The stuffing can be done by bits or bytes of all zeros or all ones (00 or FF16), as well as other data patterns that can easily be compressed at a great level. Then, the compressed media of frame K of each stream having the common size of frame K is stored 612 in an appropriate place at the MP4MR-DB 250 based on the information written in a cell in the MDT in the junction of row K and the column that is associated to the relevant stream. Then the MDT is updated with information on where to store the next frame of that stream. Then the value of K is incremented by one.

Next, a decision is made at to whether 620 the end of file was reached. If the end of the file has not been reached, the process 600 returns to block 608 for processing the next frame, frame K+1. If 620 the end of file was reached, then the common metadata, which can serve the two or more trans-rated MPEG-4 files, can be prepared 622 from the information stored in the MDT. Per each trans-rated frame, the common metadata can comprise the type of frame, the offset in bytes of the beginning of the frame from the beginning of the file, the offset in time, etc. Because of the stuffing, which was added in block 610, the parameters of a certain frame are indifferent to the compressed bit-rate parameter used to compress that frame. The prepared common metadata can be stored in the MP4MR-DB 250 and the MP4DB-T can be updated 622 with information stored in the MDT related to the location in MP4MR-DB 250 in which trans-rated file is stored and the location in which the common metadata is stored. Next the MDT can be released 624, the MM 260 can be informed that the trans-rating process of that cached file is ended and method 600 can be terminated.

The following section describes a few examples of methods that can be implemented by an embodiment of an MRTRCS 300 (FIG. 3) for trans-rating an MPEG-4 file in real time while downloading the MPEG-4 file from a web server in response to a request received from an SE 110 (FIG. 1). The trans-rating process can be adapted to a currently available bandwidth over the connection to the requesting SE 110.

Figure 7:
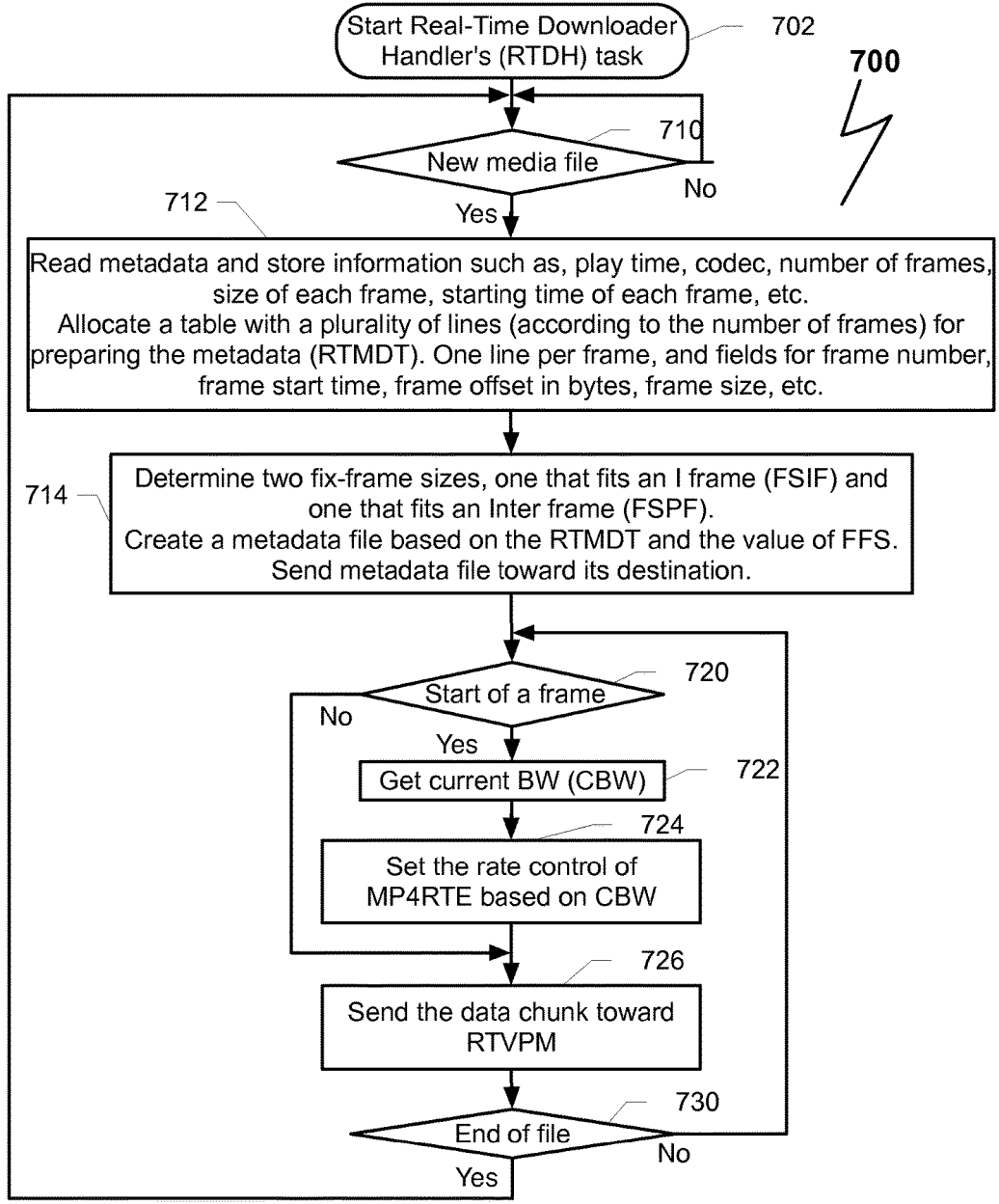
FIG. 7 illustrates a flowchart with relevant actions of a process of a Real-Time-downloader handler in an example of MPEG-4 Real-Time-Rate-Controller Server.

FIG. 7 is a flow diagram illustrating relevant actions of a process 700 of a Real-Time-downloader handler (RTDH) 324 (FIG. 3) in an exemplary MPEG-4 Real-Time-Rate-Controller Server 300. The process 700 can be used for real-time handling of MPEG-4 packets received from a web server and targeted toward a requesting SE 110 (FIG. 1) and adapting their bit-rate according to a current available bandwidth (CBW) over the connection, which will carry them. The process 700 can commence upon initiating the relevant RTMP4SH 320 (FIG. 3) and can be executed 702 by the RTDH 324 (FIG. 3), for example.

Upon initiation, the queue at the ingress of the RTDH 324 can be checked 710 for determining whether a packet with the beginning of a new compressed media file is queued up. The compressed media file can be a container file that complies with the MPEG-4 protocol, for example. If 710 there are no packets of new file in the queue, then the process 700 can wait until a packet carrying the beginning of a file is placed into the queue. If 710 a packet exists in the queue, then the metadata of the file can be read 712 and information regarding the file can be stored. Information such as the duration of playing the file, codec, number of frames, size of each frame, starting time of each frame, etc. A real-time-metadata table (RTMDT) can be allocated to store information that can be used for preparing the new metadata which can be used for the trans-rated file.

A non-limiting example of the RTMDT can comprise a plurality of rows and columns. The first rows can include general information related to that file, such as duration of playing the file, codec, etc. Each of the following rows can be associated with a frame along the file. The plurality of columns can include a certain type of information that is related to a frame in the cells along the column. The first columns can include information on the type of frame (Intra or Inter) the next column can include information that is related to that frame in the received original MPEG-4 file. This may include information such as the offset in bytes of the beginning of the frame, the size of the frame, in the original file, etc. The following columns can be used for storing calculated information related to each frame of the trans-rated file, such as information regarding the offset in bytes of the beginning of the trans-rated frame, the size of the trans-rated frame, etc. This information has to be calculated in advance before trans-rating the received MPEG-4 file; because the metadata of an MPEG-4 file is sent before the compressed media.

After preparing 712 the RTMDT, the RTDH 324 can conclude 714 from the received metadata the value of the original bit-rate (OBR), which was used while compressing the received MPEG-4 file (the original file). In addition, at block 714, the RTDH 324 can obtain from the MM 360 the value of the estimated bit-rate that can be used over the connection with the requesting SE 110, this value can be referred as the connection bit-rate (CBR). Next, the number of Intra frames and Inter frames that are included in the original file can also be determined 714.

In addition, the RTMDT can be searched 714 for finding the values of the largest-Intra frame (LIF), the Intra frame that has the maximum number of bytes, as well for the largest-Inter frame (LPF), the Inter frame that has the maximum number of bytes. Based on the found values of LIF and LPF and based on the ratio between the CBR and the OBR, the RTDH 324 can calculate 714 a fix size for a trans-rated Intra frame (FSIF) and a fixed size for a trans-rated Inter frame (FSPF). For example, a FSIF can be calculated as the value of LIF multiplied by the CBR divided by the OBR and multiplied by a factor. The factor can be larger than one and smaller than two, three, etc. In a similar way, an FSPF can be calculated as the value of LPF multiplied by the CBR divided by the OBR and multiplied by the same factor or a similar one. After calculating the values of the FSIF and the FSPF, an example process of the FSA 340 and H.264 encoding 328 can be initiated. The values of the FSIF and FSPF can be loaded to the H.264 encoder 328 and to the FSA 340.

Further, the original metadata can be manipulated 714 to get a new metadata that matches the values of the FSIF and the FSPF. The offset value of each frame can be changed to match the number of preceding Intra frames multiplied by the FSIF plus the number of preceding Inter frame multiplied by the FSPF. In addition, the size of each frame written in the metadata can be adapted to its type, FSIF or FSPF for example. The new metadata can be transferred 714 toward the destination SE 110 (FIG. 1) via proxy 310 and the process 700 can start trans-rating data chunks of the received compressed file that were received and stored in the RTDH queue.

The next received data chunk can be obtained 720 from the queue of the RTDH 324 and a decision is made whether it includes a beginning of a frame. If it does not include a frame beginning, the process 700 proceeds to block 726. If 720 the obtained data chunk includes a beginning of a frame, then the value of the CBW can be obtained from the BW monitoring module 350 (FIG. 1) and accordingly a rate controller of the MP4RTE 328 can be set 724 to adapt the compression to the CBW. Next, at block 726 the obtained data chunk is transferred toward the RTVPM 326 to be decoded and for further processing by MP4RTE 328, FSA 340 and LLE 342, which is disclosed above in conjunction with FIG. 3 and below in conjunction with FIG. 8. At block 730, a decision is made whether the end of file was reached. If 730 the end of the file has not been reached, the process 700 returns to block 720 for handling the next data chunk. If 730 the end of file was reached, then the process 700 returns to block 710 for starting the processing a next received MPEG-4 file.

Figure 8:
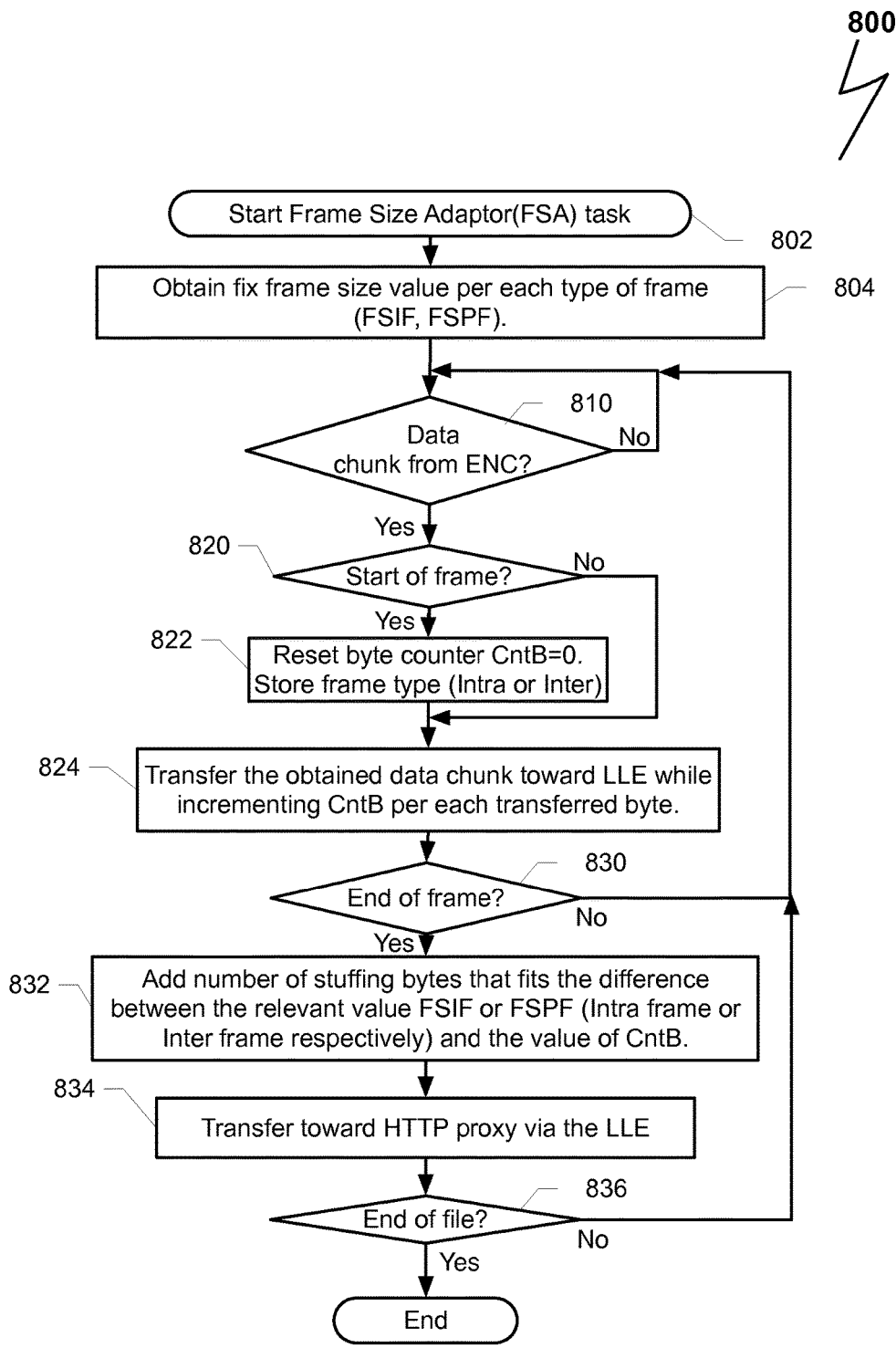
FIG. 8 illustrates a flowchart with relevant actions of a frame size adapter (FSA) of an example of MPEG-4 Real-Time-Rate-Controller Server.

FIG. 8 is a flow diagram illustrating relevant actions of an exemplary process 800 that can be handled by an exemplary frame size adapter (FSA) 340 (FIG. 3) of an exemplary MRTRCS 300. In some embodiments of the MRTRCS 300, the process 800 can be initiated 802 by the RTDH 324 in block 712 of the process 700 (FIG. 7) after calculating the values of the FSIF and the FSPF. After initiation, the values of the FSIF and the FSPF can be obtained 804 from the RTDH 324 and the process 800 can wait 810 for a compressed data chunk to be received from the MP4RTE 328.

The obtained compressed data chunk can be parsed and a decision can be made 820 as to whether it includes the start of a frame. If 820 the data chunk includes the start of a frame, then a byte counter of a frame can be reset 822 (CntB=0), the frame type, Intra or Inter, can be stored in a memory of FSA 340, and the obtained data chunk is transferred 824 toward the LLE 342 (FIG. 3) while incrementing 824 the value of CntB for each byte of the transferred data chunk. If 820 the data chunk is not the start of a frame, then the process 800 can proceed toward block 824.

While transferring 824 the data chunk toward the LLE, the data is observed looking 830 for an end-of-frame indication and end of file indication. If 830 the obtained data chuck does not include the end of frame, then process 800 returns to block 810 for handling the rest of the frame that can be carried over the next one or more packets. If 830 the obtained data chuck includes the end of the frame, then process 800, based on the stored frame type, can compare 832 the value of CntB (the number of bytes in the compressed frame) to the value of FSIF (for an Intra frame) or FSPF (for an Inter frame). Then, stuffing bytes can be added 832 in order to fill the difference between the value of CntB and the value of FSIF (for an Intra frame) or FSPF (for an Inter frame).

At block 834 the last data chunk of that frame with the stuffing is transferred toward the requesting SE 110 (FIG. 1) via HTTP proxy 310 and LLE 342. At block 834, a decision can be made whether the end of file was reached. If not, the process 800 can return to block 810 waiting for the next data chunk. If 834 the end of file was reached, then the process 800 can be terminated and the FSA 340 may wait until a new file is received.

It will be appreciated that while the various embodiments of the present invention have been described primarily as the provisioning of multiple video streams compressed at different bit rates and choosing a particular stream based on which bit rate is most suitable for a currently available BW, that other techniques may also be employed in addition to or in lieu of bit rate changing. Those skilled in the art will appreciate that similar techniques could be applied to reduce file sized by reducing the quality or the resolution of the video file. In such an embodiment, when the currently available bandwidth decreases, a video stream of lower quality video or resolution may be selected for the continued download of the media content. Similarly, other compression techniques may be used, such as reducing or eliminating certain frames, converting the content to black and white rather than color, etc. Similarly, in these and other techniques, a reduced file size for downloading the media content can be selected for degraded BW and, larger file sizes can be used when more BW is available. The various techniques employed to reduce the file sizes, although they may be considered to be novel in and of themselves, are not necessarily required in all embodiments and, embodiments may employ one or more such techniques.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

What is claimed is:

1. A method for preparing a trans-rated database (TRDB) stored in a memory device, wherein the TRDB stores one or more trans-rated copies of an original media file, the method comprising the actions of:
    (a) obtaining a video frame of an original video file;
    (b) compressing the obtained video frame in accordance with two or more bit-rate values to deliver two or more compressed video frames each having a different number of bytes but representing the same video frame of the original file;
    (c) equalizing the number of bytes of the two or more compressed video frames by adding stuffing bytes to create two or more equal-size-trans-rated frames;
    (d) storing each one of the two or more equal-size-trans-rated frames into a memory device;

(e) creating metadata comprising the number of bytes of the equal-size-trans-rated frames and the location in the memory device in which each of the equal-size-trans-rated frames is stored and storing the metadata into the memory device;

(f) repeating actions (a) to (e) for multiple frames of the original file until the end of file for producing two or more stored trans-rated copies of the original video file and a copy of the metadata with information regarding each frame of the two or more stored trans-rated copies of the original video file; and (g) when a stored equal-size-trans-rated frame is retrieved from the memory element, further compressing the retrieved frame by using a lossless compression process;

wherein the action of compressing the obtained video frame complies with video compression standards comprising a container file that has metadata before the beginning of the compressed video data.

2. The method of claim 1, wherein the lossless compressing process complies with GZIP.

3. The method of claim 1, further comprising:

(h) determining when a stored trans-rated copy of the original video file is needed to be retrieved from the memory device to be sent toward a requesting device;

(i) retrieving the copy of the stored metadata and prepare the metadata to be sent toward the requesting device before the compressed video data;

(j) selecting one of the two or more stored trans-rated copies of the original video file that matches a defined value of a constraint (DVC);

(k) retrieving the first frame of the selected copy to be transferred toward the requesting device after the metadata;

(l) retrieving one or more following frames of the selected copy to be transferred toward the requesting device;

(m) obtaining an update indication of the DVC;

(n) selecting one of the two or more stored trans-rated copies of the original video file that matches the updated DVC indication;

(o) retrieving one or more following frames from the selected copy, which matches the updated DVC, to be transferred toward the requesting device; and (p) repeating actions (m) to (o) until transferring the requested file.

4. The method of claim 1, wherein the original file is a compressed video file and the action of obtaining a video frame of the original video file further comprises decoding the obtained compressed video frame.

5. The method of claim 4, wherein the original file is a compressed video file received at an intermediate server, further comprising:

calculating a hash value on a predefine number of bytes from the beginning of the original compressed file;

associating the two or more stored trans-rated copies of the original video file and the metadata with the calculated hash value.

6. The method of claim 1, wherein stuffing is implemented by adding one or more bytes of a known value.

7. The method of claim 1, wherein the container file is MPEG-4 file-format.

8. The method of claim 1, wherein the metadata includes an associated entry for each frame and comprises information regarding the type of the frame, the offset in time from the beginning of the file and the offset in bytes from the beginning of the file.

9. The method of claim 8, wherein the action of determining is implemented at an intermediate node based on a hash value calculated on a predefine number of bytes from the beginning of a received original video file.

10. The method of claim 8, wherein the constraint is a current available bandwidth towards the requesting device.

11. A method for adapting a video file for transmission over a channel, wherein the channel may have varying levels of constraints, the method comprising:

intercepting at an intermediate server, packets that contain a video file that is being sent from a web server and targeted toward a surfer equipment (SE), wherein the packets include metadata transmitted once at the beginning of the video file and frames of compressed video data;

processing, at the intermediate server, the received metadata and determining particular metrics regarding the compressed video file;

modifying the received metadata to match the values of the particular metrics;

transferring the modified metadata once toward the SE;

receiving one or more compressed video frames; and modifying each of the one or more compressed video frames into one or more adjusted video frames wherein each of the one or more adjusted video frames is more suited for the constraints on the channel and are in conformance with the metadata resulting in each of the adjusted video frames being the same size, and wherein the packets comprise a container file that includes the metadata, the particular metrics include the number of bytes per frame, and wherein, the action of modifying the compressed video frames into one or more adjusted video frames comprises bit-wise trans-rating one or more received frames in accordance with a defined value of constraint.

12. The method of claim 11 further comprising:

adding stuffing bytes to the trans-rated frame to provide a matched frame, wherein the number of bytes in the matched frame is equal to the value of number of bytes per that frame in the modified metadata;

compressing the matched frame by a lossless compression process for providing a lossless compressed frame; and transferring the lossless compressed frame toward the SE.

13. The method of claim 12, wherein the number of bytes of each matched frame is a fixed value for similar type of frames of the trans-rated file.

14. The method of claim 12, wherein the value of each matched frame size depends on the frame type.

15. The method of claim 12, wherein the constraint is the currently available bandwidth on the channel with the SE.

16. The method of claim 12, wherein the metadata that describes the trans-rated video files is transmitted before the compressed video data.

17. A non-transitory computer readable medium, on which are stored instructions comprising instructions that when executed by an intermediate-server apparatus cause the intermediate-server apparatus to:

(a) obtain a video frame of an original video file;

(b) compress the obtained video frame in accordance with two or more bit-rate values to deliver two or more compressed video frames each having a different number of bytes;

(c) equalize the number of bytes of the two or more compressed video frames by adding stuffing bytes to create two or more equal-size-trans-rated frames;

(d) store each one of the two or more equal-size-trans-rated frames into a memory device;

(e) create metadata comprising the number of bytes of the equal-size-trans-rated frames and the location in the memory device in which each of the equal-size-trans-rated frames is stored and storing the metadata into the memory device; and
(f) repeat actions (a) to (e) for multiple frames of the original file until the end of file for producing two or more stored trans-rated copies of the original video file and a copy of the metadata with information regarding each frame of the two or more stored trans-rated copies of the original video file;
wherein retrieving a stored equal-size-trans-rated frame from the memory device, further compressing the retrieved frame by using a lossless compression process, wherein the action of compressing the retrieved frame complies with video compression standards comprising a container file that has metadata before the beginning of the compressed video data.

* * * * *